United States Patent [19]

Sone

[11] Patent Number: 5,675,642
[45] Date of Patent: Oct. 7, 1997

[54] VARIABLE LENGTH DATA SWITCH AND A VARIABLE LENGTH DATA RELAYING METHOD USING THE VARIABLE LENGTH DATA SWITCH

[75] Inventor: Yukio Sone, Kawasaki, Japan

[73] Assignee: Fujitsu Limited, Kanagawa, Japan

[21] Appl. No.: 541,789

[22] Filed: Oct. 10, 1995

[30] Foreign Application Priority Data

Feb. 16, 1995 [JP] Japan ................................ 7-028467

[51] Int. Cl.$^6$ ................................ H04J 3/26; H04L 12/56
[52] U.S. Cl. ................................ 370/389; 370/471
[58] Field of Search ................................ 370/60, 60.1, 94.1, 370/94.2, 389, 395, 465, 466, 470, 471

[56] References Cited

U.S. PATENT DOCUMENTS

| | | | |
|---|---|---|---|
| 5,490,141 | 2/1996 | Lai et al. | 370/60.1 |
| 5,528,590 | 6/1996 | Iidaka et al. | 370/60.1 |
| 5,548,589 | 8/1996 | Jeon et al. | 370/60.1 |
| 5,570,362 | 10/1996 | Nishimura | 370/471 |

FOREIGN PATENT DOCUMENTS 5-268255  10/1993  Japan .

*Primary Examiner*—Melvin Marcelo
*Attorney, Agent, or Firm*—Helfgott & Karas, P.C.

[57] ABSTRACT

A variable length data switch and a variable length data relaying method using the variable length data switch are suited for accommodating an ATM-LAN or the like in a frame relay switch as the variable length data switch. The variable length data switch has a receiver side cell line configuring unit including a fixed length data receiving element for receiving fixed length data from a fixed length data line and a receiver side data converting element for converting the fixed length data received by the fixed length data receiving element, a variable length data switching unit for switching the variable length data from the receiver side cell line configuring unit, and a transmitter side cell line configuring unit including a transmitter side data converting element for converting the variable length data from the variable length data switching unit and a fixed length data transmitting element for transmitting converted fixed length data to a fixed length data line, thereby realizing a simple fixed length data switch.

27 Claims, 32 Drawing Sheets

FRAME RELAY SWITCH ENABLING A CELL RELAY SWITCHING

VARIABLE LENGTH DATA SWITCH AND A VARIABLE LENGTH DATA RELAYING METHOD USING THE VARIABLE LENGTH DATA SWITCH

BACKGROUND OF THE INVENTION

The present invention relates to a variable length data switch and a variable length data relaying method using the variable length data switch suitable for accommodating an ATM-LAN (Asynchronous Transfer Mode-LAN) or the like in a frame relay switch as the variable data switch.

A lot of researches have been made on a technique using a frame relay communication system for communicating variable length data or a technique using an ATM communication system (a cell relay communication system) for communicating fixed length data as a data communication system in recent years, following an introduction of an ISDN (Integrated Services Digital Network) technique or a recommendation of ITU-T.

The cell relay communication system is being researched and developed for the purpose of realization of a multimedia communication including a future voice and/or image communication based on a high-speed transmission above 150 Mbps. The cell relay communication system is expected to be used as a high-speed LAN (ATM-LAN) at present.

To realize WAN (wide area network) corresponding to ATM-LAN, there is a possibility the use an ATM switch or an ATM multiplexer which can control cells as they are.

If the above ATM switch or the ATM multiplexer is used, it is necessary to transfer cells at 150 Mbps by a WAN circuit which charges a leased line rate. The user therefore needs to pay a large amount of leased line charge, so a use of it in a network of a general company is not realistic.

To comply with this, there is a plan of using a leased line as a WAN circuit in such a way that a high-speed control above 150 Mbps is conducted inside while a low-speed leased line is used on the relay line side to decrease the speed.

SUMMARY OF THE INVENTION

To overcome the above problem, an object of the present invention is to provide a variable length data switch and a variable data relaying method using the variable length data switch, which can employ a general frame relay in the relay system, and accommodate an ATM-LAN on the terminal side so as to realize a cell relay switching with a simple structure.

The present invention therefore provides a variable length data switch comprising a receiver side cell line configuring unit having a fixed length data receiving means for receiving fixed length data from a fixed length data line and a receiver side data converting means for converting the fixed length data received by said fixed length data receiving means into variable length data, a variable length data switching unit for switching the variable length data from said receiver side cell line configuring unit, and a transmitter side cell line configuring unit having a transmitter side data converting means for converting the variable length data from said variable length data switching unit into fixed length data and a fixed length data transmitting means for transmitting the converted fixed length data to a fixed length data line.

According to this invention, the variable length data from the variable length data line may be switched in a variable length data switching, and the fixed length data from the fixed length data line may be relayed as well. It is therefore possible to use general variable length data in the relay system, and configure a system accommodating a fixed length data terminal on the terminal side.

The present invention further provides a variable length data switch comprising a receiver side cell line configuring unit having a fixed length data receiving means for receiving fixed length data from a fixed length data line and a receiver side data converting means for converting said received fixed length data into variable length data, a variable length data switching unit for switching the variable length data from said receiver side cell line configuring unit, and a variable length data transmitting unit for transmitting the variable length data from said variable length data switching unit to a variable length data line.

According to this invention, the variable length data from the variable length data line may be switched in a variable length data switching, and the fixed length data from the fixed length data line may be relayed as well. It is therefore possible to use general variable length data in the relay system, and configure a system accommodating a fixed length data terminal on the terminal side.

The present invention still further provides a variable length data switch comprising a variable length data receiving means for receiving variable length data from a variable length data line, a variable length data switching unit for switching the variable length data from said variable length data receiving means, and a transmitter side cell line configuring unit having a transmitter side data converting means for converting the variable length data from said variable length data switching unit and a fixed length data transmitting means for transmitting the fixed length data converted by said transmitter side data converting means to a fixed length data line.

According to this invention, the variable length data from the variable length data line may be switched in a variable length data switching, and the fixed length data from the fixed length data line may be relayed as well. It is therefore possible to use general variable length data in the relay system, and configure a system accommodating a fixed length data terminal at the terminal side.

The present invention still further provides a variable length data switch comprising a variable length data switching unit for switching variable length data, a receiver side cell line configuring unit connected to said variable length data switching unit, and having a fixed length data receiving means for receiving fixed length data from a fixed length data line and a receiver side data converting means for converting the fixed length data received by said fixed length data receiving means into variable length data and outputting it to said variable length data switching unit, a transmitter side cell line configuring unit connected to said variable length data switching unit, and having a transmitter side data converting means for converting the variable length data from said variable length data switching unit into fixed length data and a fixed length data transmitting means for transmitting the fixed length data converted by said transmitter side data converting means to a fixed length data line, said variable length data switching unit having a variable length data receiving means for receiving the variable length data and a variable length data transmitting means for transmitting the variable data switched to a variable length data line.

According to this invention, the variable length data from the variable length data line may be switched in a variable length data switching, and the fixed length data from the fixed length data line may be relayed as well. It is therefore possible to use general variable length data in the relay system, and configure a system accommodating a fixed length data terminal at the terminal side.

The present invention still further provides a variable length data relaying method using a variable length data switch comprising a variable length data switching unit for switching variable length data, a receiver side cell line configuring unit connected to said variable length data switching unit and having a fixed length data receiving means for receiving fixed length data from a fixed length data line and a receiver side data converting means for converting the fixed length data received by said fixed length data receiving means into variable length data and outputting it to said variable length data switching unit, and a transmitter side cell line configuring unit connected to said variable length data switching unit and having a transmitter side data converting means for converting variable length data from said variable length data switching unit into fixed length data and a fixed length data transmitting means for transmitting the fixed length data converted by said transmitter side data converting means to a fixed length data line, said variable length data switching unit having a variable length data receiving means for receiving variable length data and a variable length data transmitting means for transmitting the variable length data switched to a variable length data line, said variable length data relaying method comprising the step of forming said variable length data switching unit with plural variable data switch to switch data in a form of variable length data by relaying said plural variable data switching apparatus.

According to this invention, the variable length data from the variable length data line may be switched in a variable length data switching, and the fixed length data from the fixed length data line may be relayed as well. It is therefore possible to use general variable length data in the relay system, and configure a system accommodating a fixed length data terminal at the terminal side.

The present invention still further provides a variable length data relaying method using a variable length data switch comprising the steps of switching variable length data received from a variable length data line, converting the variable length data into fixed length data, transmitting said converted fixed length data to a fixed length data line in a first Variable length data switch comprising a variable length data receiving means for receiving variable length data from the variable length data line, a variable length data switching unit for switching the variable length data from said variable length data receiving means, and a transmitter side cell line configuring unit having a transmitter side data converting means for converting the variable length data from said variable length data switching unit into fixed length data and a fixed length cell transmitting means for transmitting said fixed length data converted to said fixed length data line, performing a cell relay of the fixed length data from said first variable data switch on the basis of a protocol of an upper layer, and converting the fixed length data relayed in the cell relay into variable length data, switching said variable length data and transmitting it to a variable length data line in a second variable length data switch comprising a receiver side cell line configuring unit having a fixed length data receiving means for receiving fixed length data from a fixed length data line and a receiver side data converting means for converting said fixed length data received into variable length data, a variable length data switching unit for switching the variable length data from said receiver side cell line configuring unit and a variable length data transmitting means for transmitting the variable length data from said variable length data switching unit to said variable length data line.

According to this invention, the variable length data from the variable length data line may be switched in a variable length data switching, and the fixed length data from the fixed length data line may be relayed as well. It is therefore possible to use general variable length data in the relay system, and configure a system accommodating a fixed length data terminal at the terminal side. If a relay of fixed length data is conducted in a part of the relay line in a relay of variable length data, it is possible to relay cells without damaging information in the relayed variable length data by performing a control on the basis of a protocol of an upper layer, and increase a freedom in design of the relay system in the communication system.

DESCRIPTION OF THE PREFERRED EMBODIMENTS (a) Description of Aspects of the Invention First, aspects of this invention will be described with reference to the drawings.

Figure 1:
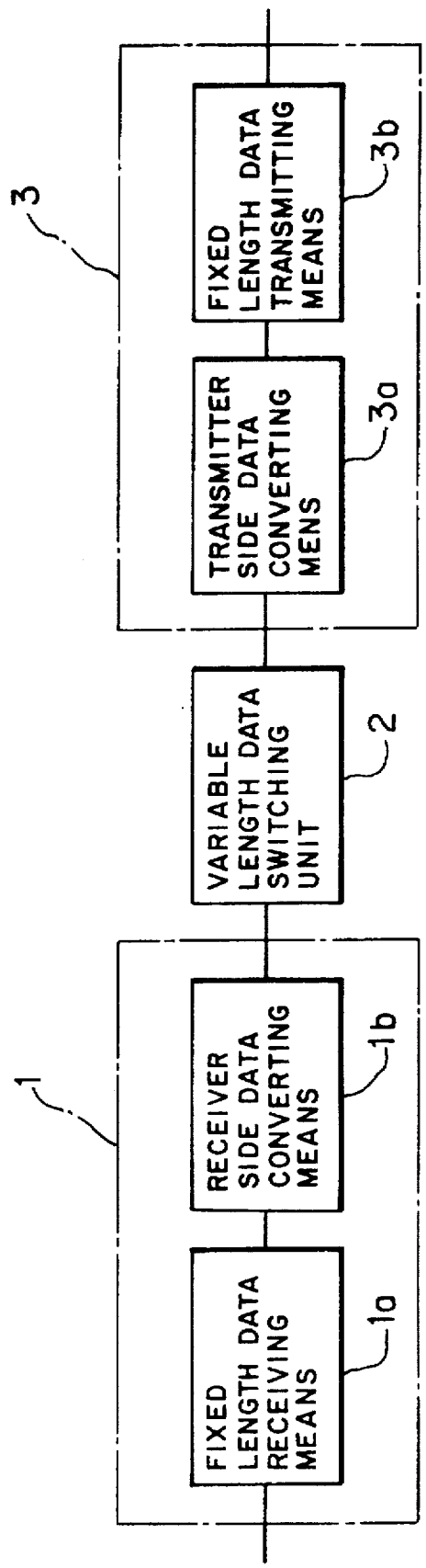
FIG. 1 is a block diagram showing an aspect of a first invention.

FIG. 1 is a block diagram showing an aspect of a first invention. In FIG. 1, reference numeral 1 denotes a receiver side cell line configuring unit. The receiver side cell line configuring unit 1 has a fixed length data receiving means 1a for receiving fixed length data from a fixed length data line and a receiver side data converting means 1b for converting the fixed length data received by the fixed length data receiving means 1a.

Reference numeral 2 denotes a variable length data switching unit. The variable length data switching unit 2 switches the variable length data from the receiver side cell line configuring unit 1.

Further, reference numeral 3 denotes a transmitter side cell line configuring unit. The transmitter side cell line configuring unit 3 has a transmitter side data converting means 3a for converting the variable length data from the variable length data switching unit 2 into fixed length data and a fixed length data transmitting means 3b for transmitting the fixed length data converted to a fixed length data line.

In the above variable length data switch of this invention shown in FIG. 1, the fixed length data receiving means 1a in the receiver side cell line configuring unit 1 receives fixed length data from the fixed length data line, and the receiver side data converting means 1b converts the fixed length data received into the variable length data.

The variable length data converting unit 2 switches the variable length data from the receiver side cell line configuring unit 1. When the transmitter side data converting means 3a in the transmitter side cell line configuring unit 3 converts the variable length data from the variable length data switching unit 2 into fixed length data, the fixed length data transmitting means 3b transmits the fixed length data converted to the fixed length data line.

According to this invention, not only variable length data from a variable length data line may be switched in a variable length data switching, but also fixed length data from a fixed length data line may be relayed. It is therefore possible to use general variable length data in the relay system and configure a system accommodating a fixed length data terminal on the terminal side.

Figure 2:
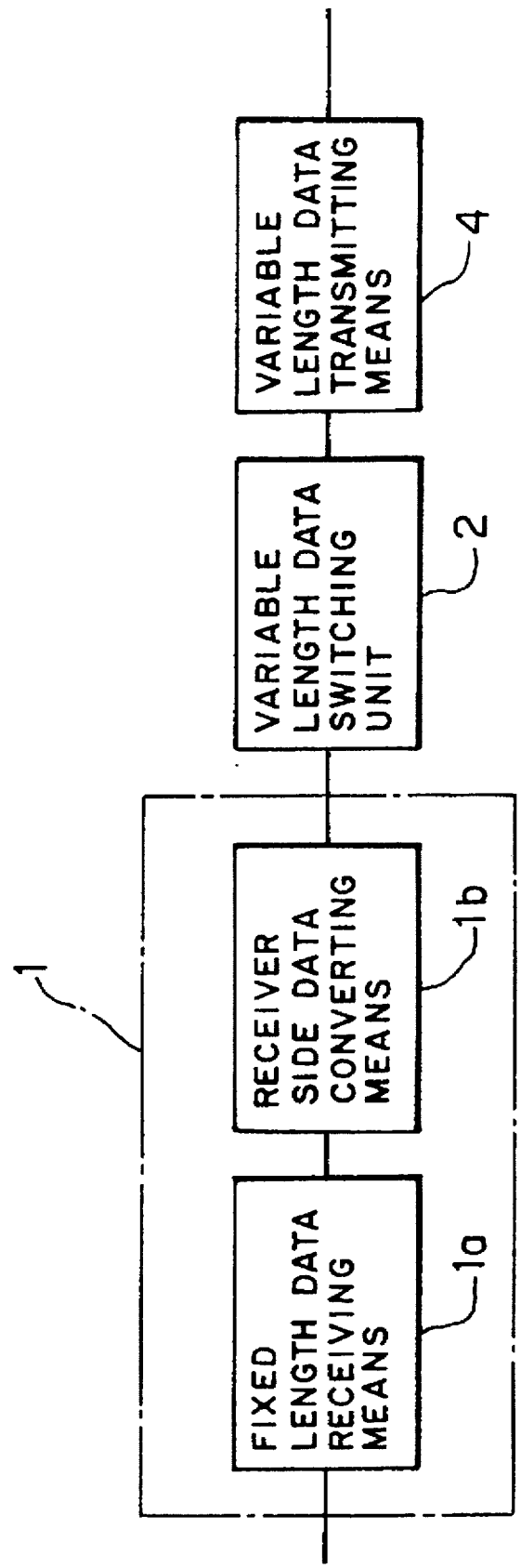
FIG. 2 is a block diagram showing an aspect of a second invention.

FIG. 2 is a block diagram showing an aspect of a second invention. In FIG. 2, reference numeral 1 denotes a receiver side cell line configuring unit similar to that having been described with reference to FIG. 1. The receiver side cell line configuring unit 1 has a fixed length data receiving means 1a for receiving fixed length data from a fixed length data line, and a receiver side data converting means 1b for converting the fixed length data received into variable length data.

Reference numeral 2 denotes a variable length data switching unit for switching the variable length data from the receiver side cell line configuring unit 1. Reference numeral 4 denotes a variable length data transmitting means for transmitting the variable length data from the variable length data switching unit 2 to a variable length data line.

In the variable length data switch shown in FIG. 2, the fixed length data receiving means 1a receives fixed length data from the fixed length data line, and the receiver side data converting means 1b converts the fixed length data into variable length data, similarly to those having been described with reference to FIG. 1.

The variable length data switching unit 2 switches the variable length data from the receiver side cell line configuring unit 1, and the variable length data transmitting means 4 transmits the variable length data to the variable length data line.

According to this invention, not only the variable length data from the variable length data line may be switched in a variable length data switching, but also the fixed length data from the fixed length data may be switched. It is therefore possible to use general variable length data in the relay system, and configure a system accommodating a fixed length data terminal on the terminal side.

Figure 3:
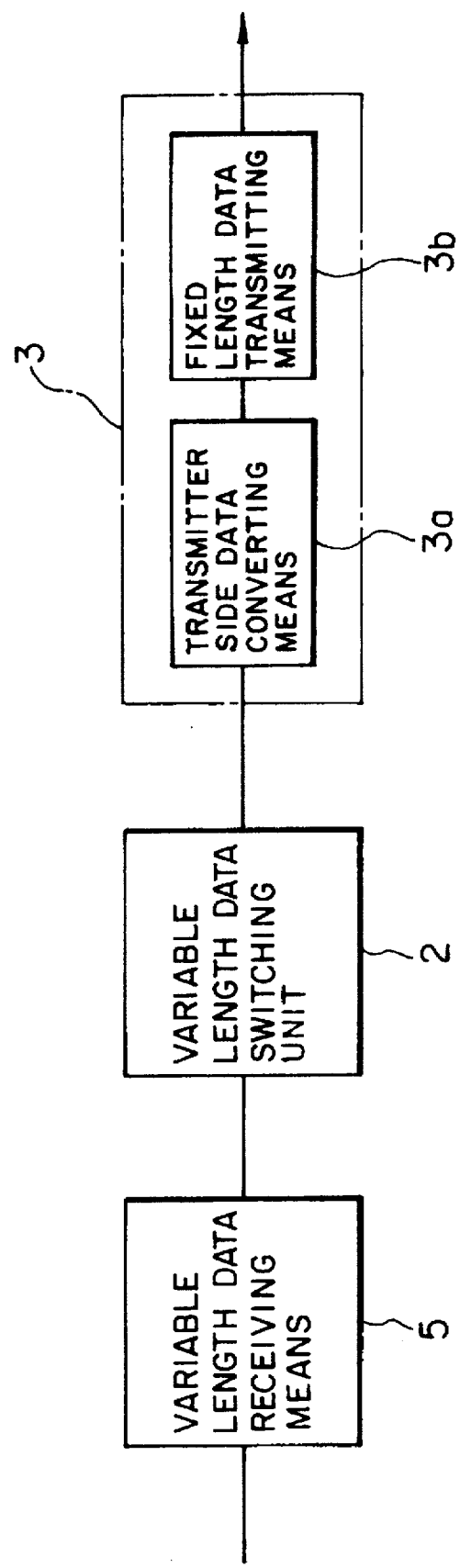
FIG. 3 is a block diagram showing an aspect of a third invention.

FIG. 3 is a block diagram showing an aspect of a third invention. In FIG. 3, reference numeral 5 denotes a variable length data receiving means for receiving variable length data from a variable length data line. Reference numeral 2 denotes a variable length data switching unit for switching the variable length data from the variable length data receiving means 5.

Reference numeral 3 denotes a receiver side cell line configuring unit similar to that having been described with reference to FIG. 1. The receiver side cell ling configuring unit 3 has a transmitter side data converting means 3a for converting the variable length data from the variable length data switching unit 2 into fixed length data, and a fixed length data transmitting means 3b for transmitting the fixed length data converted by the transmitter side data converting means 3a to a fixed length data line.

In the variable length data switch shown in FIG. 3, when the variable length data receiving means 5 receives variable length data from the variable length data line, the variable length data converting unit 2 switches the variable length data from the variable length data receiving means 5.

The transmitter side data converting means 3a converts the variable length data from the variable length data switching unit 2 into fixed length data, and the fixed length data transmitting means 3b transmits the fixed length data converted by the transmitter side data converting means 3a to the fixed length data line.

According to this invention, not only variable length data from the variable length data line may be switched in a variable length data switching, but also fixed length data from the fixed length data line may be relayed. It is therefore possible to use general variable length data in the relay system, and configure a system accommodating a fixed length data terminal on the terminal side.

Figure 4:
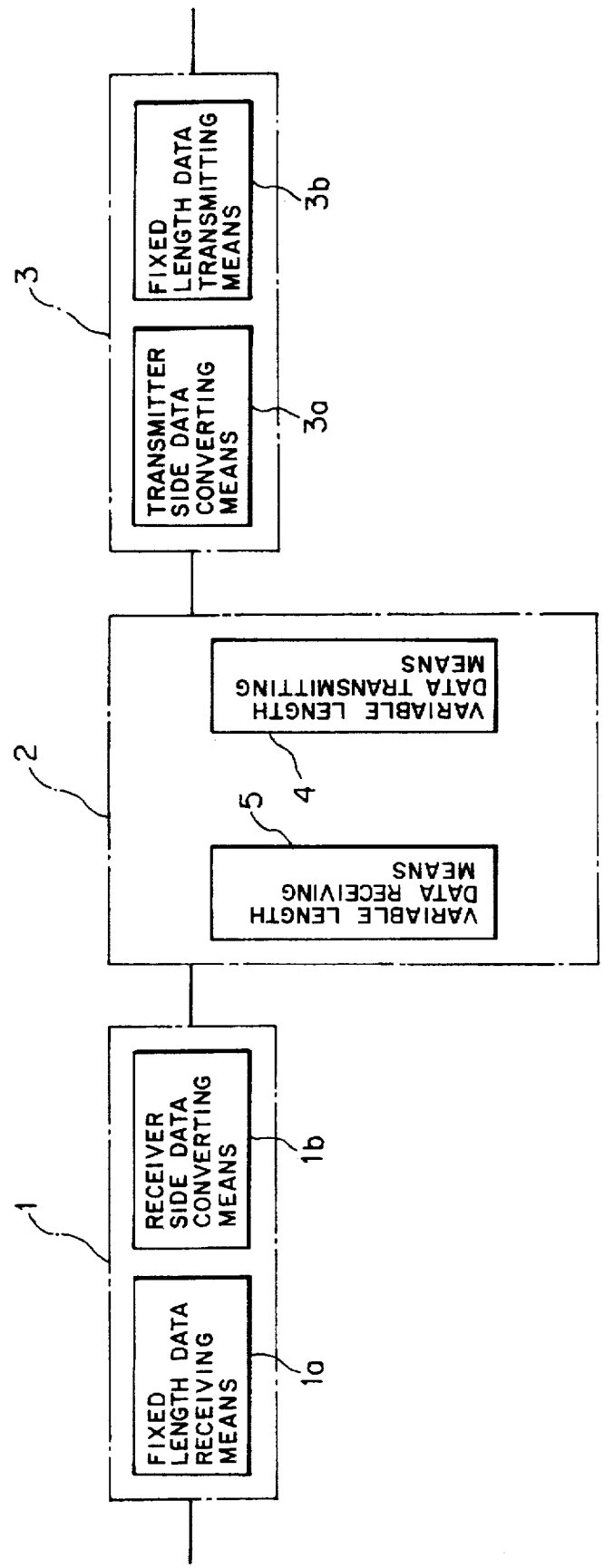
FIG. 4 is a block diagram showing an aspect of a fourth invention.

FIG. 4 is a block diagram showing an aspect of a fourth invention. In FIG. 4, reference numeral 2 denotes a variable length data switching unit for switching variable length data. The variable length data switching unit 2 has a variable length data receiving means 5 for receiving variable length data, and a variable length data transmitting means 4 for transmitting the variable length data converted to a variable length data line.

Reference numeral 1 denotes a receiver side cell line configuring unit. The receiver side cell configuring unit 1 is connected to the variable line data switching unit 2, and has a fixed length data receiving means 1a for receiving fixed length data from a fixed length data line and a receiver side data converting means 1b for converting the fixed length data received by the fixed length data receiving means 1a into variable length data and outputting it to the variable length data switching unit 2.

Reference numeral 3 denotes a transmitter side cell line configuring unit. The transmitter side cell line configuring unit 3 is connected to the variable length data switching unit 2, and has a transmitter side data converting means 3a for converting the variable length data from the variable length data switching unit 2 into fixed length data, and a fixed length data transmitting means 3b for transmitting the fixed length data converted by the transmitter side data converting means 3a to a fixed length data line.

In the above variable length data switch shown in FIG. 4, the fixed length data receiving means 1a of the receiver side cell configuring unit 1 receives fixed length data from the fixed length data line, and the receiver side data converting means 1b converts the fixed length data received into variable length data.

The fixed length data converted is received by the variable length data receiving means 5 of the variable length data switching unit 2, and the variable length data switched is transmitted from the variable length data transmitting means 4 to the variable length data line.

According to the inventions shown in FIGS. 3 and 4, the variable length data receiving means 5 may include a flow control means for performing a flow control in the variable length data line, besides performing a flow control on the fixed length data from the receiver side cell line configuring unit 1.

In practice, the variable length data switch may have a parameter converting means for converting parameters for the flow control on the fixed length data into parameters for the flow control on the variable length data when the flow control on the fixed length data is performed in the flow control means.

The flow control means in the variable length data receiving means 5 performs the flow control in the variable length data line. In addition to this, the flow control means performs the flow control on the fixed length data from the receiver side cell line configuring unit by, for example, converting the parameters for the flow control on the fixed length data into the parameters for the flow control on the variable length data by the parameter converting means.

Further, the receiver side data converting means 1b may have a means for converting fixed length data inputted for each predetermined time determined depending on the fixed length data line into one group of variable length data.

It is possible that the variable data switch includes a mode switching converting means for switching a converting process by the receiver side data converting means 1b between a mode of converting fixed length data inputted for each predetermined time into one group of variable length data and a mode of converting one group of fixed length data into one group of variable length data for each communication channel in the fixed length data line.

Accordingly, the receiver side data converting means 1b may convert fixed length data inputted for each predetermined time determined depending on the fixed length data line into one group of variable length data. In addition, it is possible that the mode switching converting means switches the mode of the converting process by the receiver side data converting means 1b between a mode of converting fixed length data inputted for each predetermined time into one group of variable length data and a mode of converting one group of fixed length data into one group of variable length data for each communication channel in the fixed length data so that the converting process may be performed.

In the variable length data switch shown in FIGS. 1, 3 and 4, the transmitter side cell line configuring means 3 may have a channel number information converting means for converting channel number information of fixed length data on the transmitter side into channel number information of fixed length data on the receiver side. The channel number information converting means may be a table having channel number information of the fixed length data on the receiver side corresponding to channel number information of the fixed length data on the transmitter side.

Accordingly, the channel number information of the fixed length data on the transmitter side may be converted into the channel number information of the fixed length data on the destination side. The channel number information converting means may be a table having channel number information of the fixed length data on the receiver side corresponding to channel number information of the fixed length data on the destination side.

Further, in the variable length data switch shown in FIGS. 1 and 4, the receiver side cell line configuring unit 1 may have a data link connection identification information setting means for setting data link connection identification information of variable length data corresponding to virtual path identification information in the transmit fixes length data, and the transmitter side cell line configuring unit 3 may have a virtual path identification information setting means for setting virtual path identification information in fixed length data corresponding to data link connection identification information in the receive variable length data.

Accordingly, the data link connection identification information setting means of the receiver side cell line configuring unit 1 may set data link connection identification information of variable length data corresponding to virtual path identification information in the transmit fixed length data. The virtual path identification information setting means of the transmitter side cell line configuring unit 3 may set virtual path identification information in the fixed length data corresponding to data link connection information in the receive variable length data.

In the variable length data switch shown in FIG. 4, the receiver side cell line configuring unit 1 and the transmitter side cell line configuring unit 3 may include in common a control circuit for implementing a cell relay on the basis of a protocol of an upper layer.

Accordingly, in the variable length data switch shown in FIG. 4, the receiver side cell line configuring unit 1 and the transmitter side cell line configuring unit 3 include in common a control circuit for implementing a cell relay on the basis of a protocol of an upper layer, whereby it becomes unnecessary to separately provide the control units.

According to this invention, not only the variable length data from the variable length data line may be switched in a variable length data switching, but also the fixed length data from the fixed length data line may be relayed. It is therefore possible to use general variable length data in the relay system, and configure a system accommodating a fixed length data terminal on the terminal side.

According to this invention, the variable length data receiving means has the flow control means for performing a flow control in the variable length data line besides performing the flow control on the fixed length data from the receiver side cell line configuring unit. It is therefore possible to simplify a function of the receiver side cell line configuring unit.

According to this invention, the parameter converting means may automatically convert flow control parameters for the fixed length data into parameters for the variable length data. It is therefore possible to contribute to an improvement of a data transfer rate.

According to this invention, plural groups of fixed length data may be converted into one group of variable length data to that the data may be efficiently transferred in the variable length data network.

According to this invention, it is possible to switch the mode between a mode of sending out plural groups of fixed length data as one group of variable length data and a mode of sending out one group of fixed length data into one group of variable length data so as to transfer the variable length data. It is therefore possible to transfer the variable length data depending on an environment of the data.

According to this invention, the receiver side cell line configuring unit and the transmitter line cell line configuring unit have in common the control circuit for performing a control according to a protocol of an upper layer. It is therefore possible to simplify a design of the system.

Further a variable length data relaying method using a variable length data switch of this invention comprising the steps of, upon a relay of variable length data using said variable length data switch, receiving fixed length data from a fixed length data line, converting the received fixed length data into variable length data, switching the variable length data, then converting the variable length data into fixed length data, and switching the fixed length data in the form of variable length data using plural variable length data switches transmitting the fixed length data to a fixed length data line.

According to this invention, the variable length data from the variable length data line may be switched in a variable length data switching, and the fixed length data from the fixed length data line may be relayed, as well. It is therefore possible to use general variable length data in the relay system, and configure a system accommodating a fixed length data terminal on the terminal side.

The variable length data relaying method using the variable length data switch of this invention is characterized in that, in a first variable length data switch similar to that defined in claim 3, variable length data received from a variable length data line is switched, this variable length data is converted into fixed length data, the fixed length data converted is transmitted to a fixed length data line, the fixed length data from the first variable length data switch is relayed in a cell relay based on a protocol of an upper layer, the fixed length data relayed in the cell relay is converted into variable length data in a second variable length data switch similar to that defined in claim 2, and the variable length data is switched and transmitted to a variable length data line.

According to this invention, not only the variable length data from the variable length data line may be switched in a variable length data switching, but also the fixed length data from the fixed length data line may be relayed. It is therefore possible to use general variable length data in the relay system, and configure a system accommodating a fixed length data terminal on the terminal side. In addition, if a relay of fixed length data is conducted in a part of a relay line in a relay of variable length data, a cell relay is feasible without damaging information of the relayed variable length data under a control based on a protocol of the upper layer, and a freedom in a design of the relay system in the communication system is increased.

Figure 5:
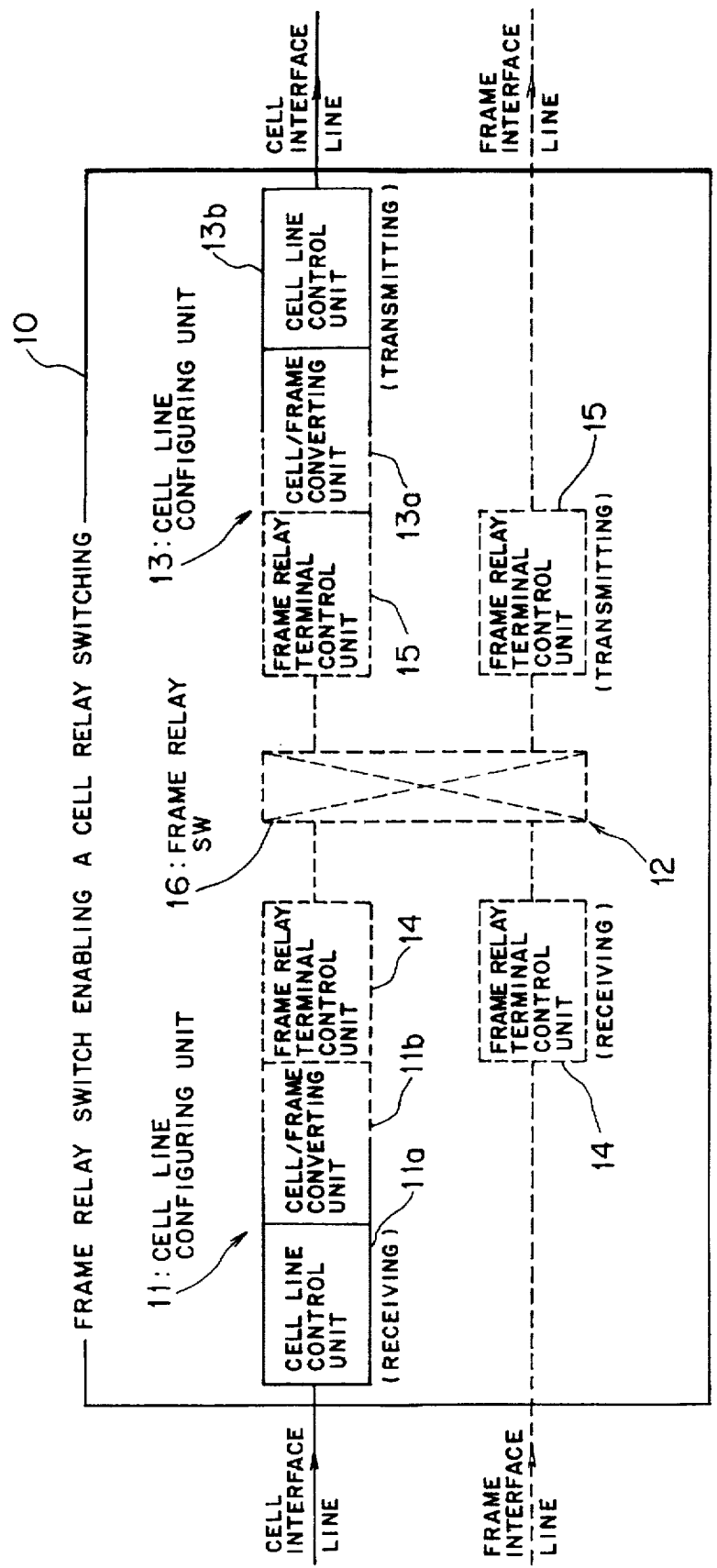
FIG. 5 is a block diagram illustrating a scheme of a frame relay switch as a variable length data switch according to an embodiment of this invention.

(b) Description of Scheme of a Frame Relay Switch as a Variable Length Data Switch according to an Embodiment of the Invention FIG. 5 is a block diagram illustrating a scheme of a frame relay switch 10 as a variable length data switch according to an embodiment of this invention. The frame relay switch 10 shown in FIG. 5 accommodates a cell interface line and a frame interface line to be able to implement a frame relay switching in a relay system.

In FIG. 5, reference numeral 12 denotes a frame data switching unit for switching frame data (variable length data). The frame data switching unit 12 has a frame relay terminal control unit (a variable length data receiving means) 14 for receiving frame data, a frame relay terminal control unit (a variable length data transmitting means) 15 for transmitting switched frame data to a frame interface line (a variable length data line), and a frame relay switch 16 for implementing a frame relay switching.

Reference numeral 11 denotes a receiver side cell line configuring unit accommodating the cell interface line as an input line. The receiver side cell line configuring unit 11 is connected to the frame data switching unit 12, and has a cell line control unit (a fixed length data receiving means) 11a for receiving cell data (fixed length data) from the cell interface line (a fixed length data line) and a cell/frame converting unit 11b for converting (encapsulating) cell data received by the cell line control unit 11a into frame data in a frame relay form and outputting it to the frame relay switching unit 12.

Reference numeral 13 denotes a transmitter side cell line configuring unit accommodating a cell relay interface line as an output line. The transmitter side cell line configuring unit 13 is connected to the frame data switching unit 12, and has a cell/frame converting unit (a transmitter side data converting means) 13a for converting frame data from the frame data converting unit 12 into cell data, and a cell line control unit (a fixed length data transmitting means) 13b for transmitting the cell data converted by the cell/frame converting unit 13a to the cell interface line.

Figure 6:
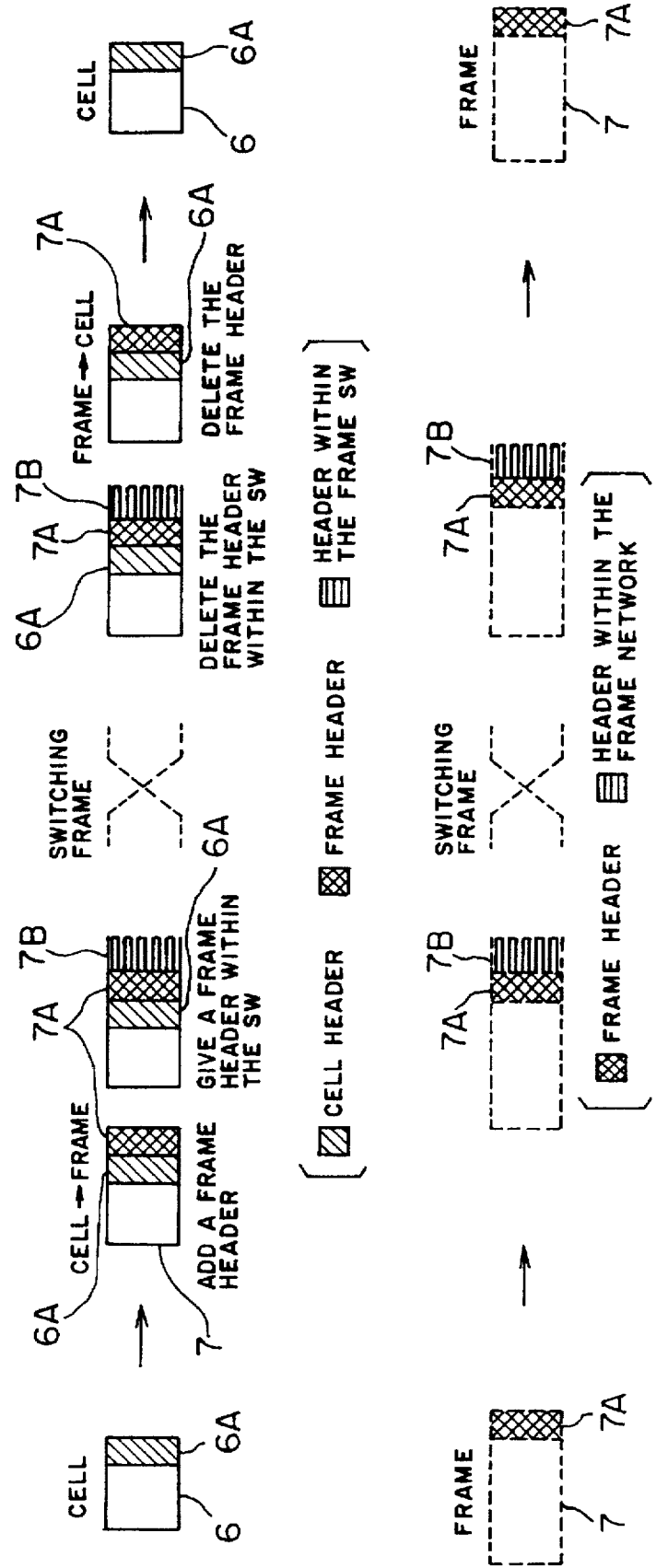
FIG. 6 illustrates an operation of the frame relay switch according to the embodiment of this invention.

The frame relay switch 10 shown in FIG. 5 with the above structure implements a frame relay switching of cell data from the cell interface line, and sends it out to the cell interface line of the output line, as shown in FIG. 6.

Namely, a cell 6 including a header portion 6A from the cell interface line is added a frame header 7A thereto in the cell/frame converting unit 11b of the receiver side cell line configuring unit 11 so as to be framed. The frame data having been framed 7 is given a frame header 7B within the frame relay switch 16 by the frame relay terminal control unit 14 so as to be subjected to a frame switching.

When a switching in the frame relay switch 16 is conducted, the frame header 7B is deleted in the frame relay terminal control unit 15, and the frame header 7A is deleted in the cell/frame converting unit 13a of the transmitter side cell line configuring unit 13 so that the cell 6 is converted into the original cell 6. The converted cell 6 is transmitted from the cell line control unit 13b to the cell interface line of the output line on the basis of channel information (VCI, VPI) of the header portion 6A.

Accordingly, the above frame relay switch 10 enables not only a frame relay switching of frame data from the frame interface line but also a relay of cell data from the cell interface line. This embodiment therefore has advantages that a general frame relay can be used in the relay system and a system accommodating an ATM-LAN can be configured on the terminal side.

Figure 7:
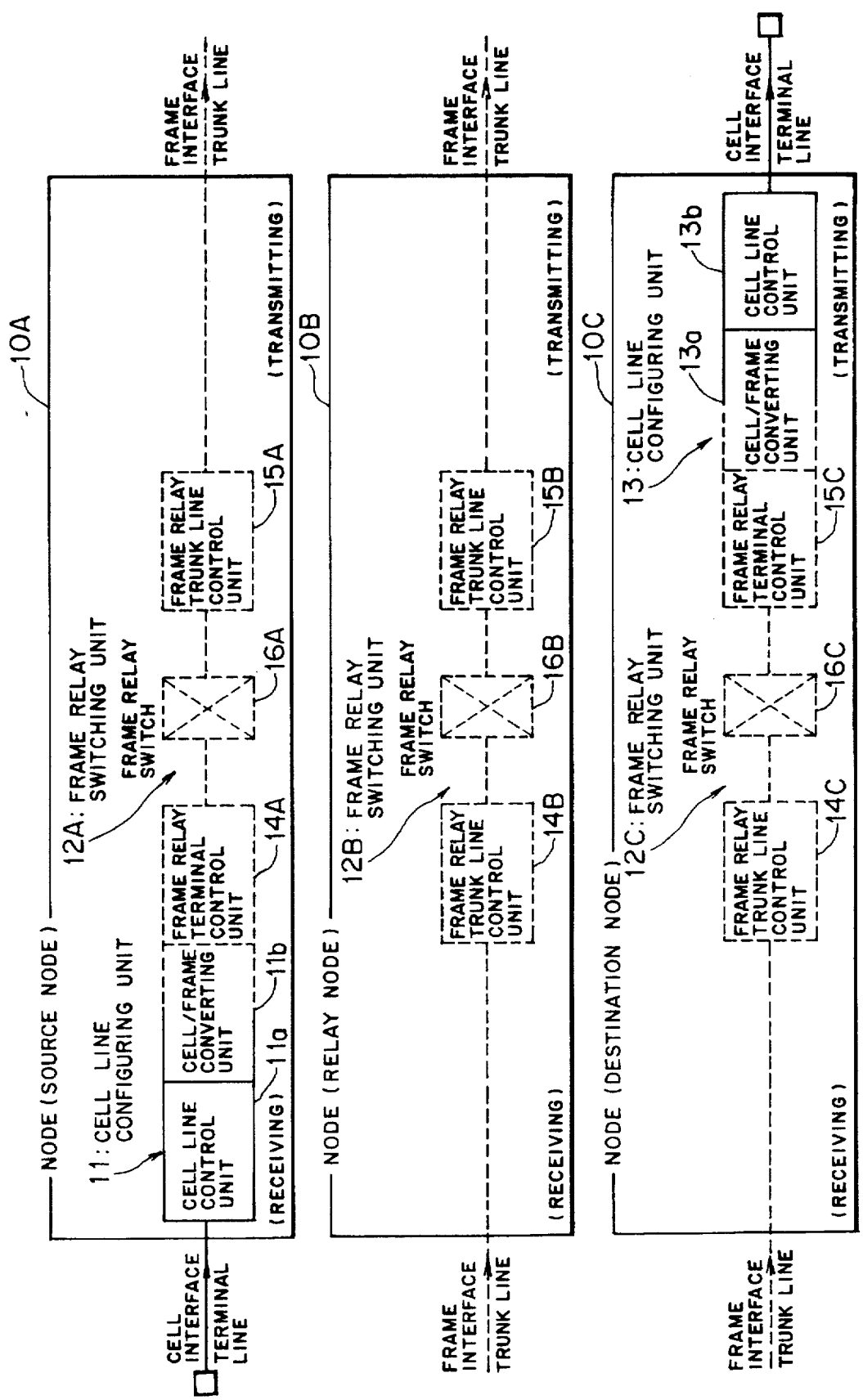
FIG. 7 illustrates a technique of relaying cell data from a cell interface line in a frame relay form within a network according to the embodiment of this invention.

(c) Description of a Technique of Relaying Cell Data in the Frame Relay Form in the Network FIG. 7 illustrates a technique of relaying cell data from the cell interface line in the frame relay form within the network. According to the relaying technique shown in FIG. 7, three frame relay switches (nodes) 10A through 10C, for example, each of which has a function similar to that of the frame relay switch shown in FIG. 5, are connected in series.

The node 10A converts cell data inputted from the cell interface line into frame data in the frame relay form, and transmits it to the node 10B via the frame interface line. The node 10A has a cell line configuring unit 11 and a frame relay switching unit 12A.

The cell line configuring unit 11 and the frame relay switching unit 12A have the similar functions of those shown in FIG. 5, respectively. The cell line configuring unit 11 has a cell line control unit 11a and a cell/frame converting unit 11b. The frame relay switching unit 12A has a frame relay terminal control unit 14A, a frame relay trunk line control unit 15A and a frame relay switch 16A.

The frame relay terminal control unit 14A and the frame relay switch 16A have the similar functions to those having been described with reference to FIG. 5, respectively (refer to reference numerals 14 and 16). The frame relay trunk line control unit 15A sends out frame data switched by the frame relay switch 16A to the frame interface line as a trunk line.

The node 10B relays frame data inputted from the node 10A via the frame interface line as it is, and transmits it to the node 10C via the frame interface line. The node 10B has a frame relay switching unit 12B similar to that having been described with reference to FIG. 5.

The frame relay switching unit 12B has a frame relay trunk line control units 14B and 15B, and a frame relay switch 16B. More specifically, the frame relay switching unit 12B has the frame relay trunk line control unit 14B for receiving frame data from the node 10A, the frame relay switch 16B for switching the frame data from the frame relay trunk line control unit 14B, and the frame relay trunk line control unit 15B for transmitting the frame data having been switched by the frame relay switch 18B to the node 10C via the frame interface line.

The switch 10C converts frame data inputted from the switch 10B via the frame interface line into cell data, and outputs it to the cell interface line as an output line. The switch 10C has a frame relay switching unit 12C and a cell line configuring unit 13 having the similar functions to those having been described with reference to FIG. 5, respectively.

The frame relay switching unit 12C has a frame relay terminal control unit 15C and a frame relay switch 16C having the similar functions to those having been described with reference FIG. 5, respectively (refer to reference numerals 15 and 16). The frame relay trunk line control unit 14A receives frame data from the node 10B.

Accordingly, the frame relay switching units 12A through 12C in the respective three nodes 10A through 10C can function as the frame relay switching unit 12 for implementing a frame relay switching.

In the frame relay switch with the above structure shown in FIG. 7, cell data inputted to the node 10A via the cell interface line is converted into frame data similarly to that showing in FIG. 5, and sent out in a form as it is via the frame relay interface line when relayed to the node 10B.

In the node 10B, the frame data is frame-relayed as well as general frame data in the frame relay switching unit 12B.

When the node 10C receives the frame data from the node 10B, a frame header portion within the network is removed in the frame relay terminal control unit 15c, the frame data is converted into cell data in the cell/frame converting unit 13a and sent out to the cell interface line via the cell line control unit 13b.

Transmit cell from the cell interface terminal on the originator side can be transferred as receive cell to the cell interface terminal on the destination side by a frame relay transfer within the network, as above. It is, therefore, advantageously possible to utilize general frame relay in the relay system and configure a system for accommodating an ATM-LAN on the terminal side.

Figure 8:
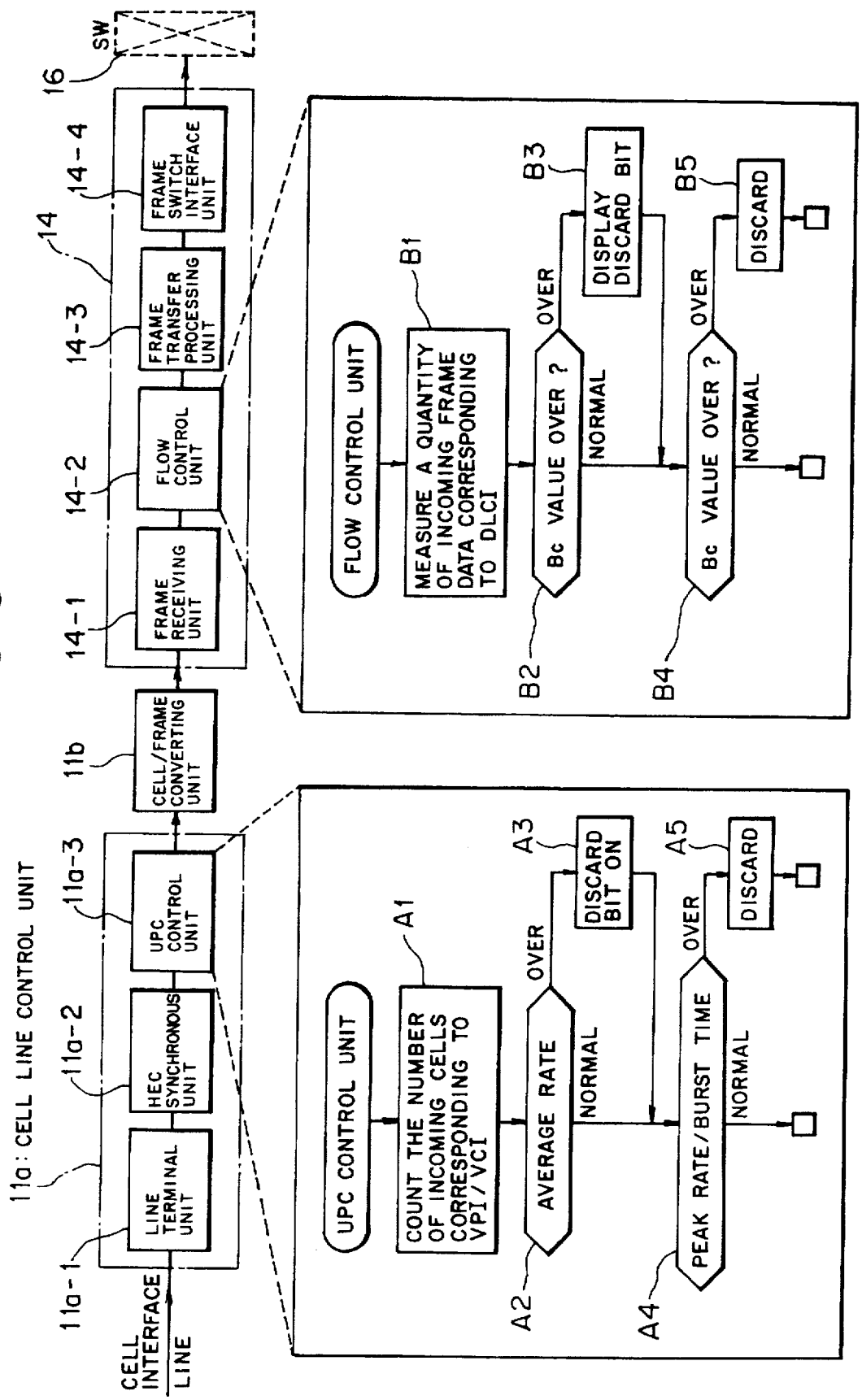
FIGS. 8 and 9 illustrate flow controls on cell data and frame data in the frame relay switch according to the embodiment of this invention.

(d) Description of a Flow Control at the Cell Line Control Unit and the Frame Relay Terminal Control Unit In the above frame relay switch shown in FIG. 5 or 7, the cell line control unit 11a has, as shown in FIG. 8, a line terminal unit 11a-1, a HEC (Header Error Control) synchronous unit 11a-3 and a UPC (Usage Parameter Control) control unit 11a-3, while the frame relay terminal control unit 14 has a frame receiving unit 14-1, a flow control unit 14-2, a frame transfer processing unit 14-3 and a frame switch interface unit 14-4.

The UPC control unit 11a-3 of the cell line control unit 11a performs a flow control on cell data inputted from the cell interface line. The flow control unit 14-2 of the frame relay terminal control unit 14 performs a flow control on frame data converted by the cell/frame converting unit 11b.

The flow controls on the cell data and the frame data by the UPC (Usage Parameter Control) control unit 11a-3 and the flow control unit 14-2 are performed respectively as follows.

The UPC control unit 11a-3 counts the number of incoming cells corresponding to VPI (virtual path identification information)/VCI (logical channel/virtual channel identification information) on the basis of information in the header portion of the cell data inputted (Step A1 in FIG. 8), and causes discard bit to be on (Step A3) if the number of the incoming cells exceeds an average rate (an Over route at Step A2).

If the number of the incoming cells exceeds a peak rate for a burst time (an Over route at Step A4), these incoming cells are discarded (Step A5).

Further, the flow control unit 14-2 measures a quantity of incoming frame data corresponding to DLCI (data link connection identification information) on the basis of information in the header portion of the frame data inputted (Step B1), displays the discard bit if the quantity of the incoming frame data exceeds a Bc value as a reference value, and discards the frame data (from an Over route at Step B3, and from an Over route at Step B4 to Step B5).

Incidentally, it is possible to use the flow control in the frame relay as an alternative means for polishing the cell data from the cell interface line. More specifically, it is possible to omit the flow control in the above UPC control unit 11a-3, and substitute the flow control unit 14-5 in the frame relay terminal control unit 14 for it, as shown in FIG. 9.

Figure 9:
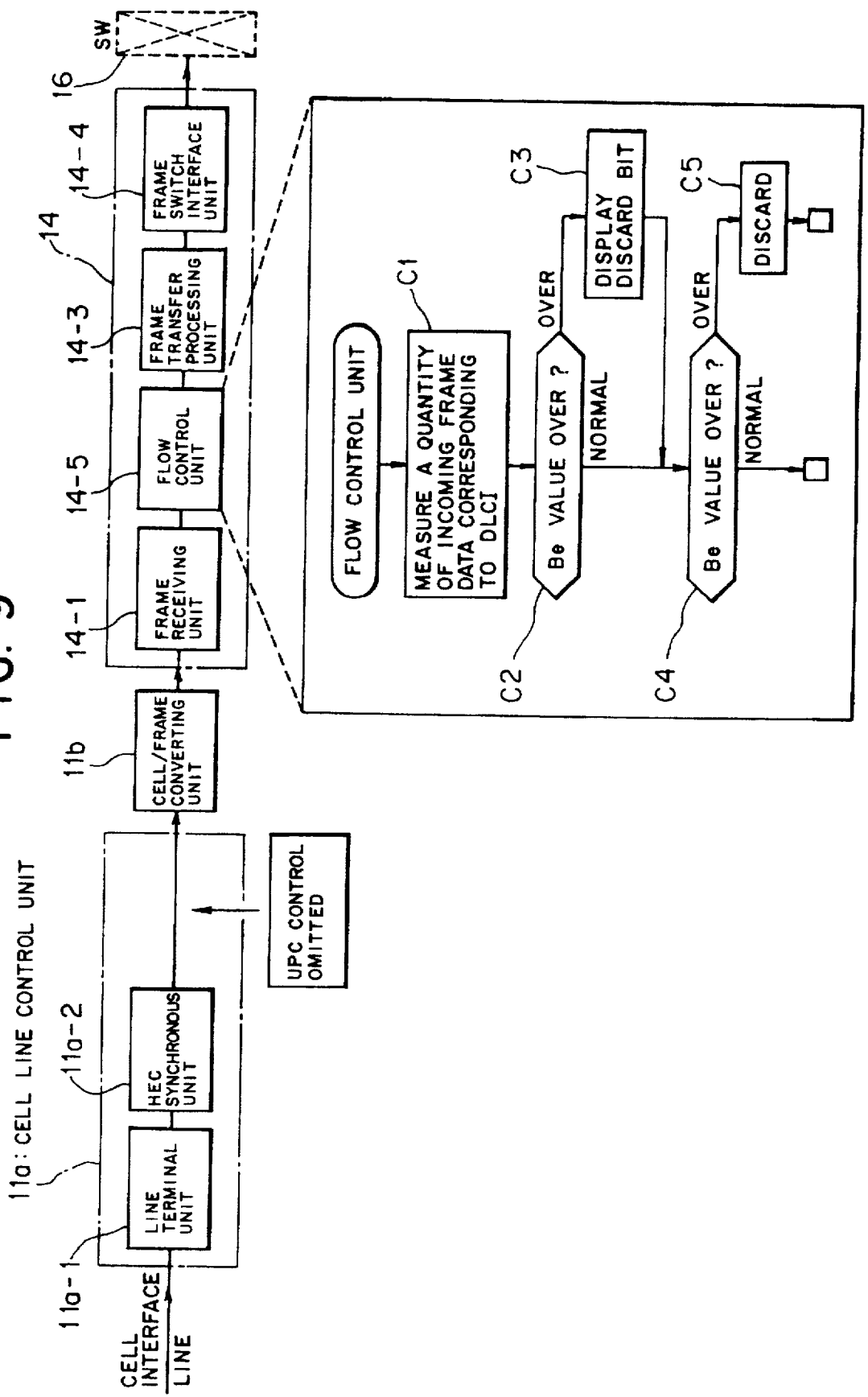

In the frame relay switch shown in FIG. 9, the UPC control unit 11a-3 on the cell base is not provided in the cell line control unit 11a. The cell frame converting unit 11b converts the cell into the frame form, after that, the flow control unit (flow control means) 14-5 in the frame relay terminal control unit 14 as a frame relay interface watches a flow rate of the inputted frames as well as another frame interface line.

More specifically, the flow control unit 14-5 measures a quantity of incoming frame data corresponding to DLCI (data line connection identification information) on the basis of information in the header portion of the inputted frame data (Step C1), and displays discard bit if the quantity of incoming frame data exceeds a Bc value set in advance as a reference value (from an Over route at Step C2 to Step C3), further discards the frame data if the quantity of the incoming frame data exceeds a Be value set in advance as a reference value (from an Over route at Step C4 to Step C5).

It is, therefore, possible to perform the flow control on the cell data in the flow control unit 14-5 in the frame relay terminal control unit 14 so as to advantageously simplify a function of the cell line control unit 11a.

Figure 10:
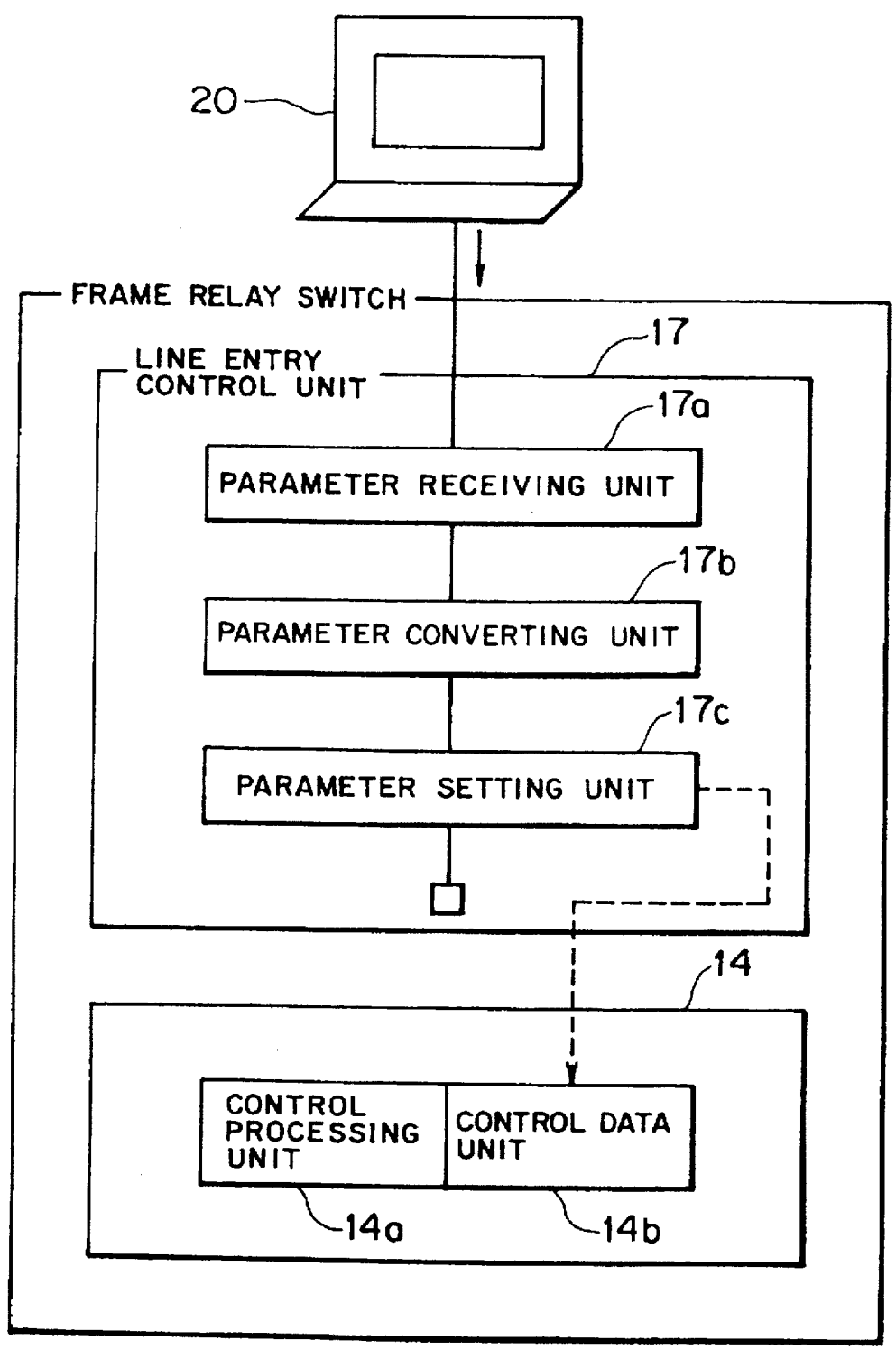
FIG. 10 is a block diagram showing an essential part of the frame relay switch according to the embodiment of this invention.

(e) Description of a Parameter Converting Technique of Converting Flow Control Parameters to Parameters for Frame Relay The above frame relay switch may include a line entry control unit 17 for converting the Bc value and the Be value used in the control by the flow control unit 14-5 or a CIR (Committed Information Rate) value necessary in a frame relay control on the basis of information in the header portion of cell data, as shown in FIG. 10.

The line entry control unit (a parameter converting means) 17 has a parameter receiving unit 17a for receiving the information in the header portion of the cell data from the cell interface line, a parameter converting unit 17b for converting parameters into parameters for the frame relay control on the basis of the information in the header portion, and a parameter setting unit 17c for entering the converted parameters in a control data unit 14b in the frame relay terminal control unit 14.

The parameter receiving unit 17a is inputted thereto an average flow rate of cells, a peak rate and a burst time corresponding to VPI (virtual path identification information)/VCI (virtual channel identification information) in the cell data.

Figure 11:
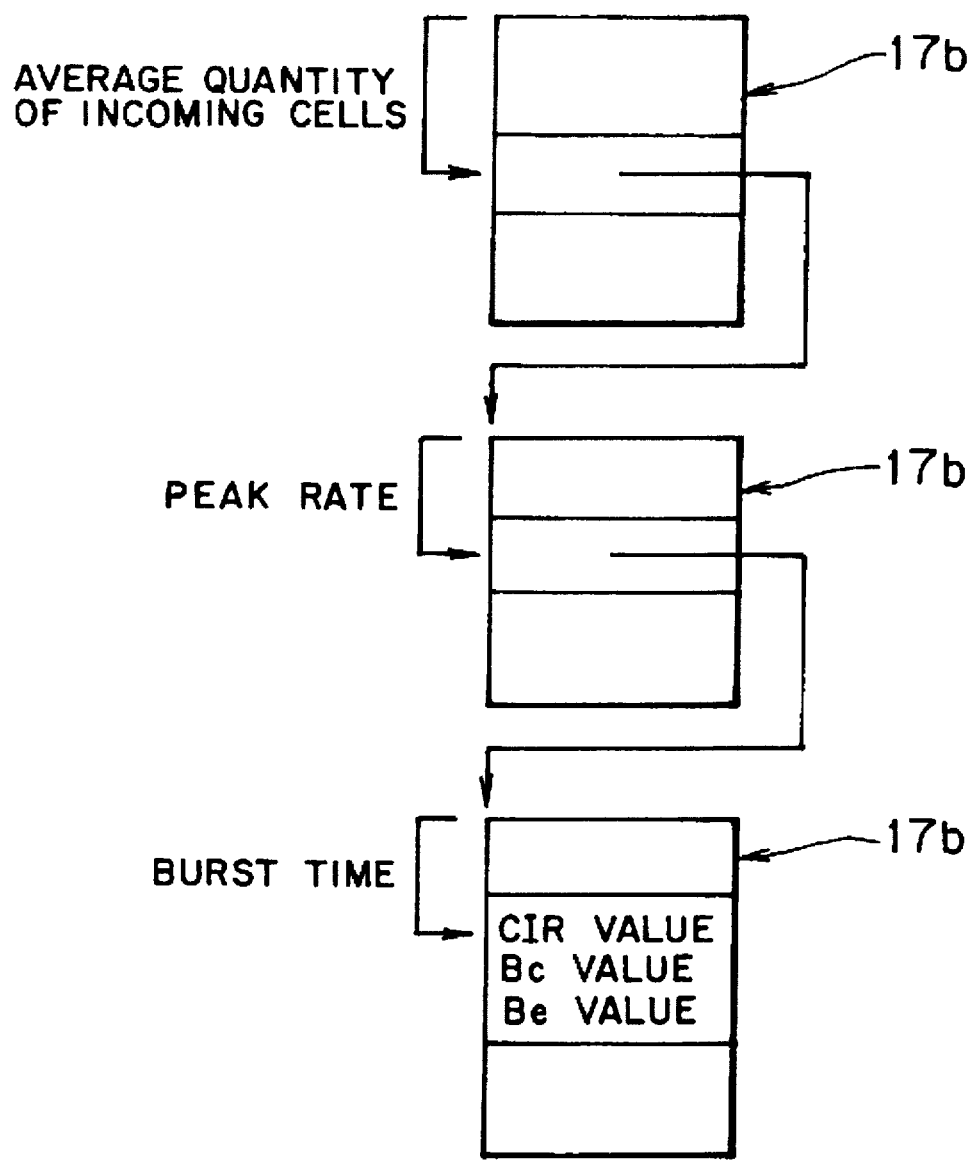
FIG. 11 shows a parameter converting unit of the frame relay switch according to the embodiment of this invention.

The parameter converting unit 17b functions as a table by which the Bc value, the Be value and the CIR value are automatically converted according to a combination of the three parameters of the inputted average flow rate of cells, peak rate and burst time, as shown in FIG. 11.

The control processing unit 14a performs a frame relay control by the frame relay terminal control unit 14 such as the flow control by the flow control unit 14-5 on the basis of the parameters set in the control data unit 14b.

When line information is entered from the cell interface terminal 20 sending out the cell data into the frame relay switch as a node, entry information in the header portion of the cell is used, and the line entry control unit 17 of the frame relay switch automatically converts it into flow rate control parameters for a frame relay in an internal process.

Figure 12:
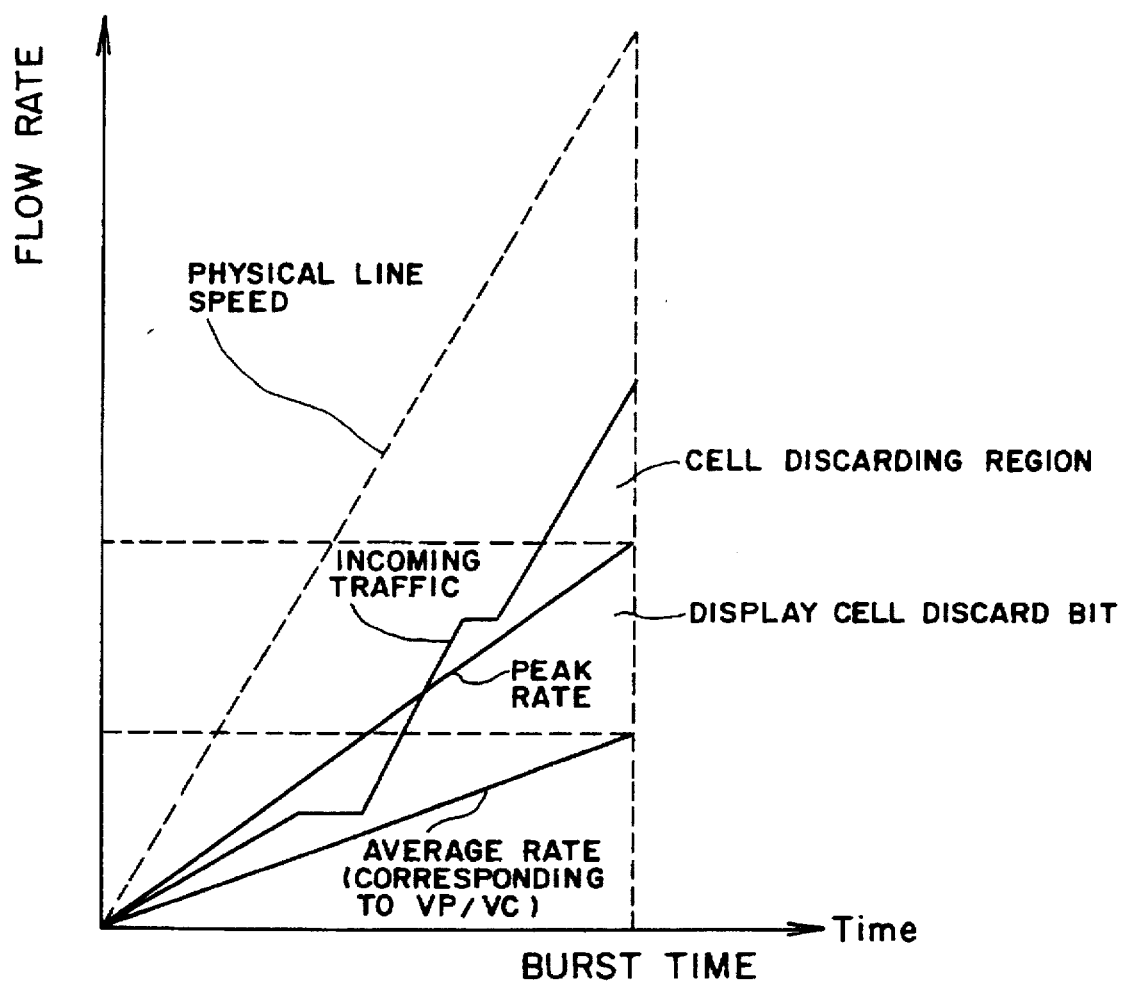
FIG. 12 shows flow control parameters in a cell relay according to the embodiment of this invention.
Figure 13:
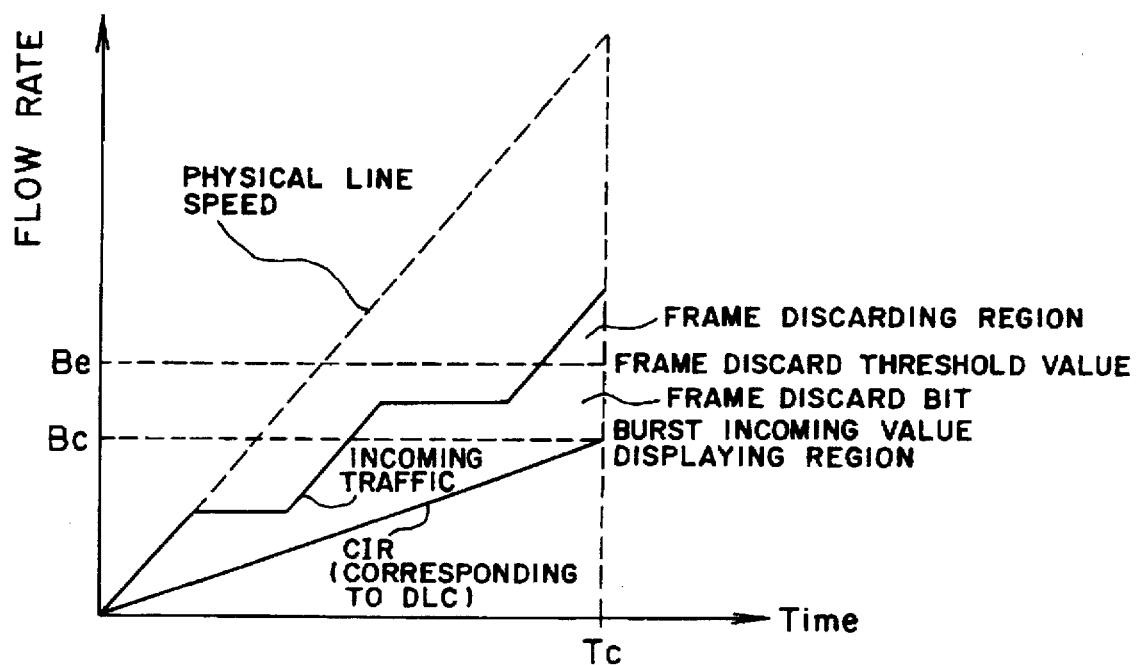
FIG. 13 shows flow control parameters in a frame relay according to the embodiment of this invention.

If the control parameters for the cell data are actually converted into the control parameters for frame data, the flow control parameters for the cell data are as shown in FIG. 12, while the control parameters for the frame data are as shown in FIG. 13.

The parameter converting unit 17b can convert the burst time as Tc, a product of the peak rate and the burst time as Be, the average cell flow rate as the CIR value, and a product of the average cell flow rate and the burst time as the Bc value on the basis of the relations in FIGS. 12 and 13.

Accordingly, the parameter converting unit 17b can automatically convert the flow control parameters for a cell relay into the parameters for a frame relay. This contributes to an improvement of a data transfer rate.

(f) Description of a Technique of Sending Out Plural Cells as One Frame

Figure 14:
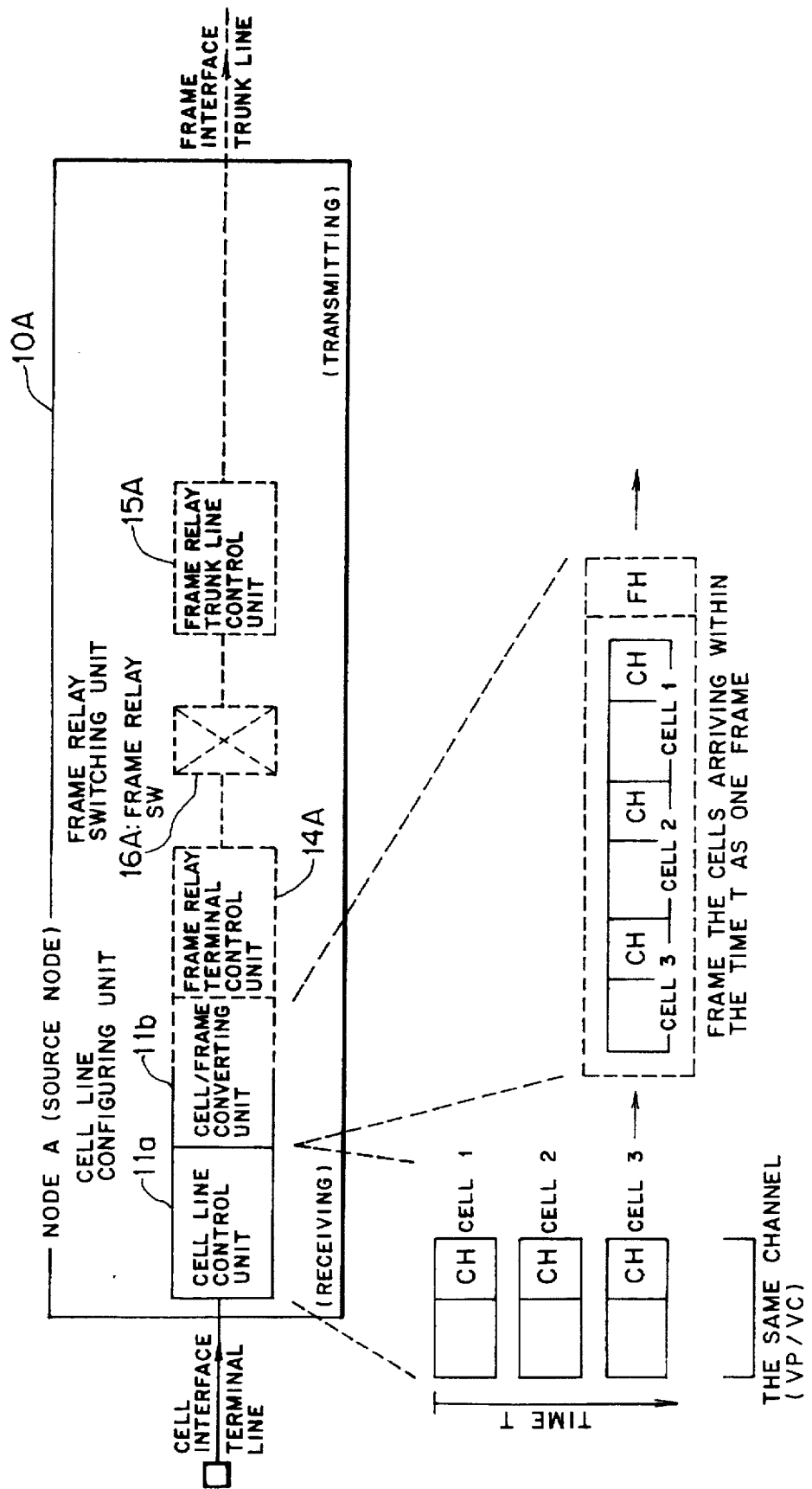
FIG. 14 is a block diagram showing an essential part of the frame relay switch according to the embodiment of this invention.

In the above frame relay switch 10A shown in FIG. 7, the cell/frame converting unit 11b converts cell data inputted for each predetermined time T determined depending on the cell interface line into one frame of data, as shown in FIG. 14.

When receiving the cell data from the cell interface line, the cell line control unit 11a does not immediately transfer the received cell, but waits for the predetermined time T. The cell line control unit 11a collects cells of data (three cells of data, in this case) having the same logical channel (DLCI) successively inputted within the predetermined time T, and transfers them together.

The cell/frame converting unit 11b assembles the cell data inputted for the predetermined time T from the cell line control unit 11a to convert it into one frame, after that, transfers it via the frame relay terminal control unit 14A within the network.

In the frame relay switch 10C on the receiver side (refer to FIG. 7), the frame data formed as one frame with the three cells of data by the cell/frame converting unit 13a is inputted in the cell/frame converting unit 13a, and the cell/frame converting unit 13a disassembles the frame to convert it into the original cell data. The converted cell data is sent out to the cell interface line via the cell line control unit 13b.

Figure 15:
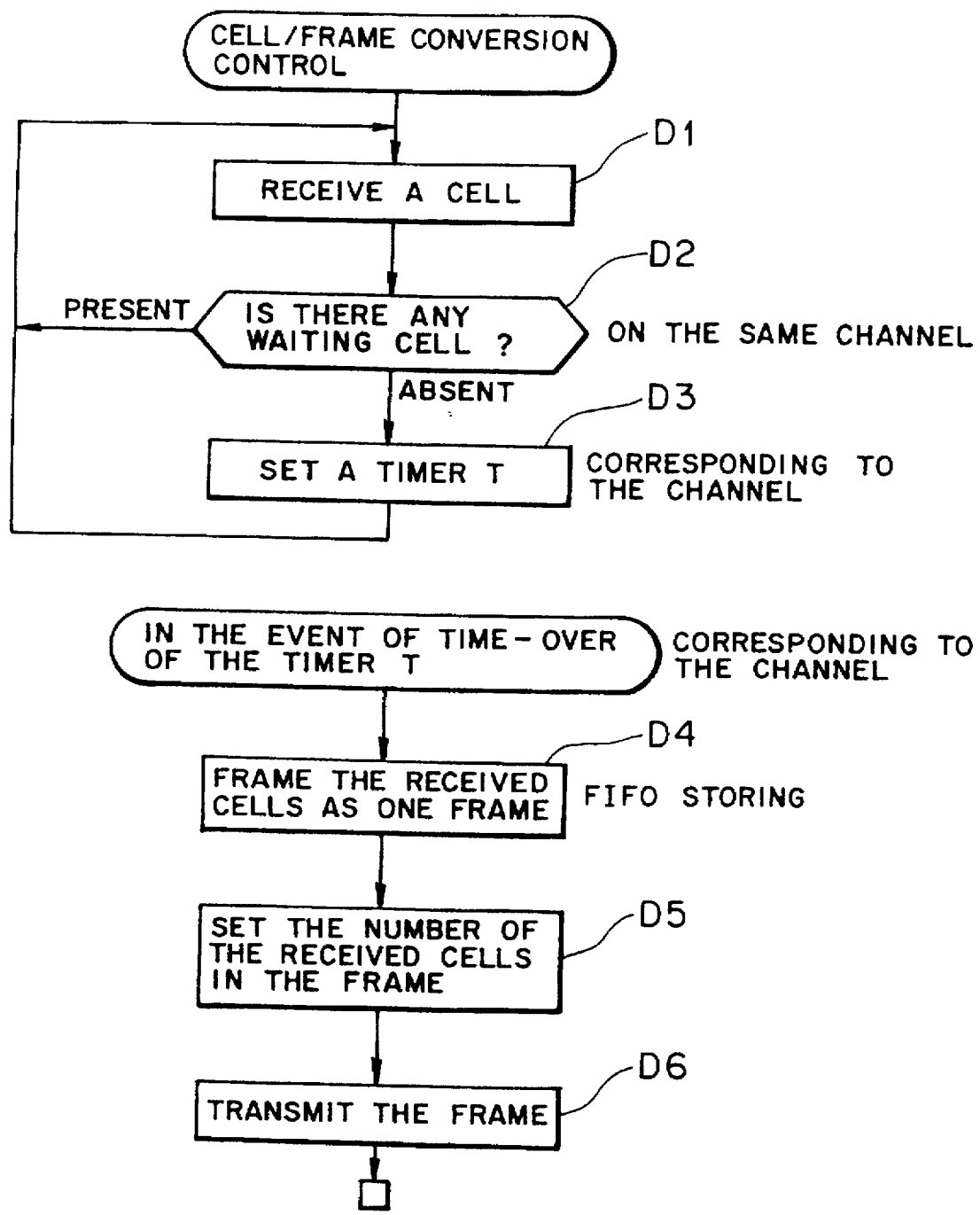
FIG. 15 is a flowchart for illustrating an operation of the embodiment of this invention.

The frame relay switch with the above structure according to this embodiment frames plural cells having the same logical channel as one frame as illustrated in a flowchart in FIG. 15.

When the cell line control unit 11a receives the cell data from the cell interface line (Step D1), the cell line control unit 11a sets a timer T if there is no waiting cell on the same channel (from an Absent route at Step D2 to Step D3). The inputted cell data is successively stored in a FIFO storage in the cell line control unit 11a in the order inputted until the timer T becomes time-out.

When the timer set becomes time-out, the received cells stored in the FIFO storage are framed by the cell/frame converting unit 11b (Step D4), information about the number of received cells is set in the information in the frame header portion (Step D5), the frame data is transmitted by the frame relay terminal control unit 14A (Step D6).

In the receiver side frame relay switch 10C inputted the frame data composed of the three cells of data as one frame (refer to FIG. 7) thereto, the cell/frame converting unit 13a disassembles the frame data to convert it into the original cell data, and sends it out to the cell interface line via the cell line control unit 13b.

As above, the frame relay switch according to this embodiment can transfer plural cells as one frame in a frame relay so as to efficiently transfer data within the frame relay network.

Figure 16:
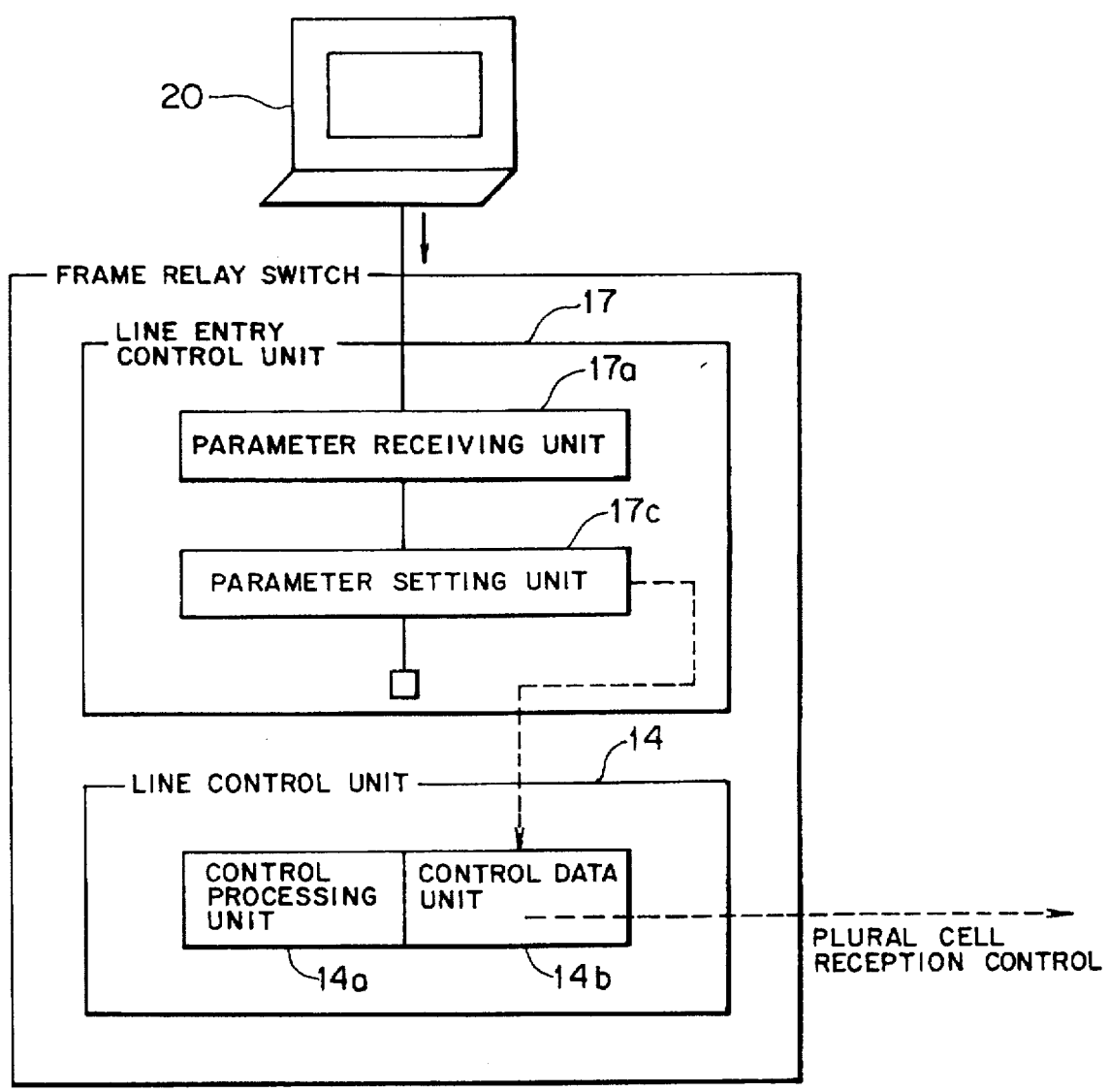
FIG. 16 is a block diagram showing an essential part of the frame relay switch according to the embodiment of this invention.
Figure 17:
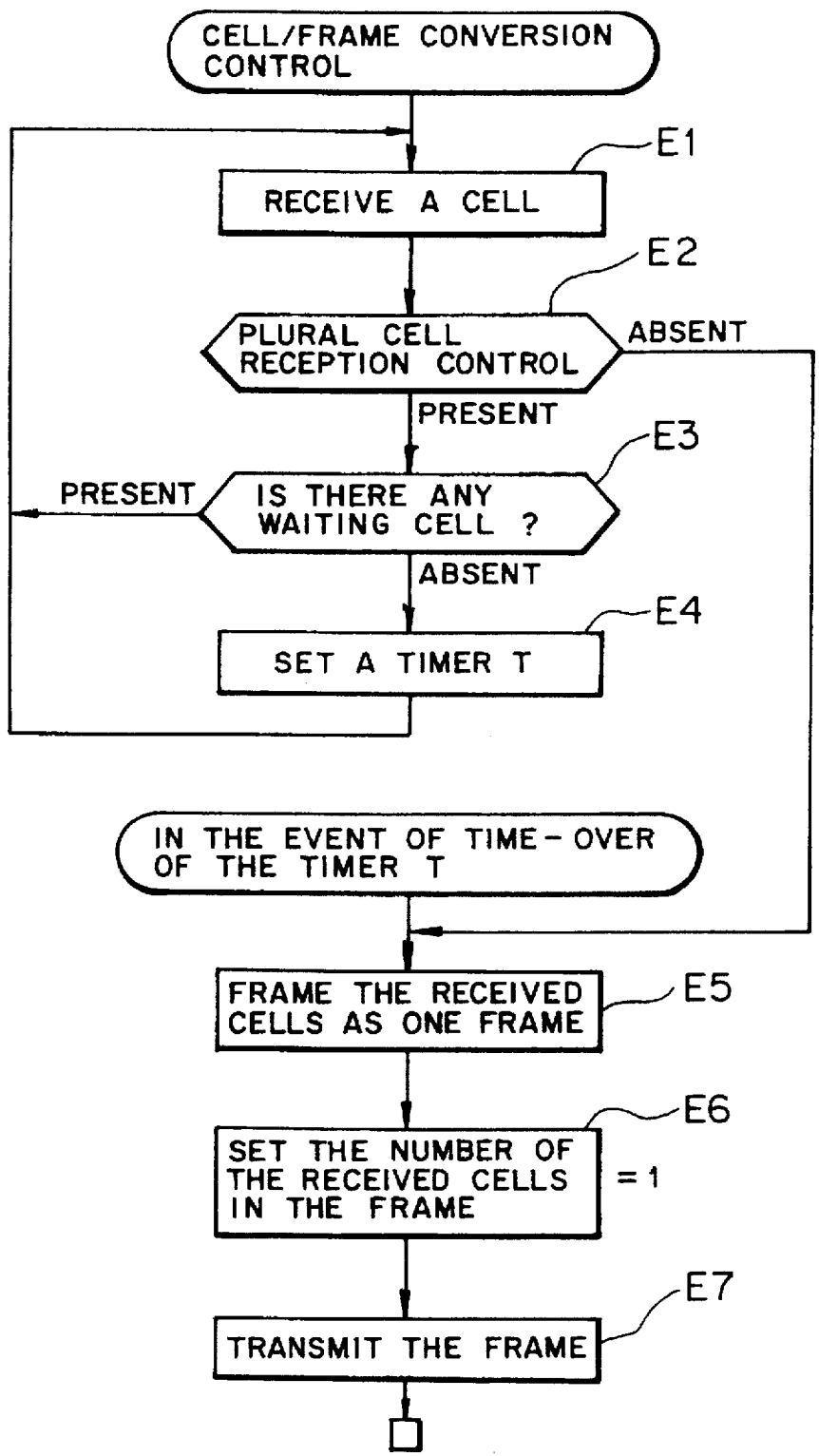
FIG. 17 is a flowchart for illustrating a switching control of a frame sending mode in the frame relay switch according to the embodiment of this invention.

(g) Description of a Switching Control Between a Mode of Sending Out Plural Cells as One Frame and a Mode of Sending Out One Cell as One Frame FIGS. 16 and 17 illustrate a switching control between a mode of sending out plural cells as one frame and a mode of sending out one cell as one frame by the cell line constituting unit 11 in the frame relay switch according to this embodiment.

The frame relay switch shown in FIG. 16 can switch a converting process by the cell line configuring unit 11 between a mode of converting cell data inputted within a predetermined time into one frame and a mode of converting one cell of data into one group of variable length data for each communication channel in the cell interface line, as well as the above (e).

The control mode by the cell line configuring unit 11 can be switched in the control processing unit 14a of the line control unit 14 on the basis of mode switching information by adding the mode switching information to the flow rate control parameters thrown in from the cell interface terminal 20 when a line entry is implemented through the cell interface terminal 20.

More specifically, when the parameter receiving unit 17a of the line entry control unit 17 in the frame relay switch receives the flow rate control parameters, the parameter setting unit 17c sets these parameters as control data in the control data unit 14b of the line control unit 14. The control processing unit 14a controls the frame relay on the basis of the parameters set in the control data unit 14b.

The switching control between the mode of sending out plural cells as one frame and the mode of sending out one cell as one frame in the frame relay switch with the above structure according to this embodiment is performed as illustrated in a flowchart shown in FIG. 17.

When the cell line control unit 11a receives cell data from the cell interface line (Step E1), if a plural cell receiving control is set on the basis of the parameters set in the control data unit 14b (a Present route at Step E2), the timer T is set if there is no waiting cell on the same channel, similarly to the above process shown in FIG. 15 (from an Absent route at Step E3 to Step E4). The inputted cell data is successively stored in the FIFO storage in the cell line control unit 11a in the order inputted until the timer T becomes time-out.

When the timer set becomes time-out, the received cells stored in the FIFO storage is framed in the cell/frame converting unit 11b (Step E5), information about the number of the received cells is set in the information of the frame header unit (Step E6), and the frame data is transmitted from the frame relay terminal control unit 14A (Step E7).

If the plural cell receiving control is not set (an Absent route at Step E2), the one cell of data received is framed as it is (Step E5), information about the number of received cell (one cell) is set in the information of the frame header portion (Step E6), and the frame data is transmitted from the frame relay terminal control unit 14A (Step E7).

In the receiver side frame relay switch 10C inputted the frame data (refer to FIG. 7) thereto, the cell/frame converting unit 13a converts the frame data into the original cell data, and sends it out to the cell interface line via the cell line control unit 13b.

According to the frame relay switch of this embodiment, it is possible to switch the mode between the mode of sending out plural cells as one frame and the mode of sending out one cell as one frame so as to transfer the frame. This embodiment therefore has an advantage of implementing a frame transfer according to an environment of the data.

(h) Description of a First Mode of Converting the Logical Channel

Figure 18:
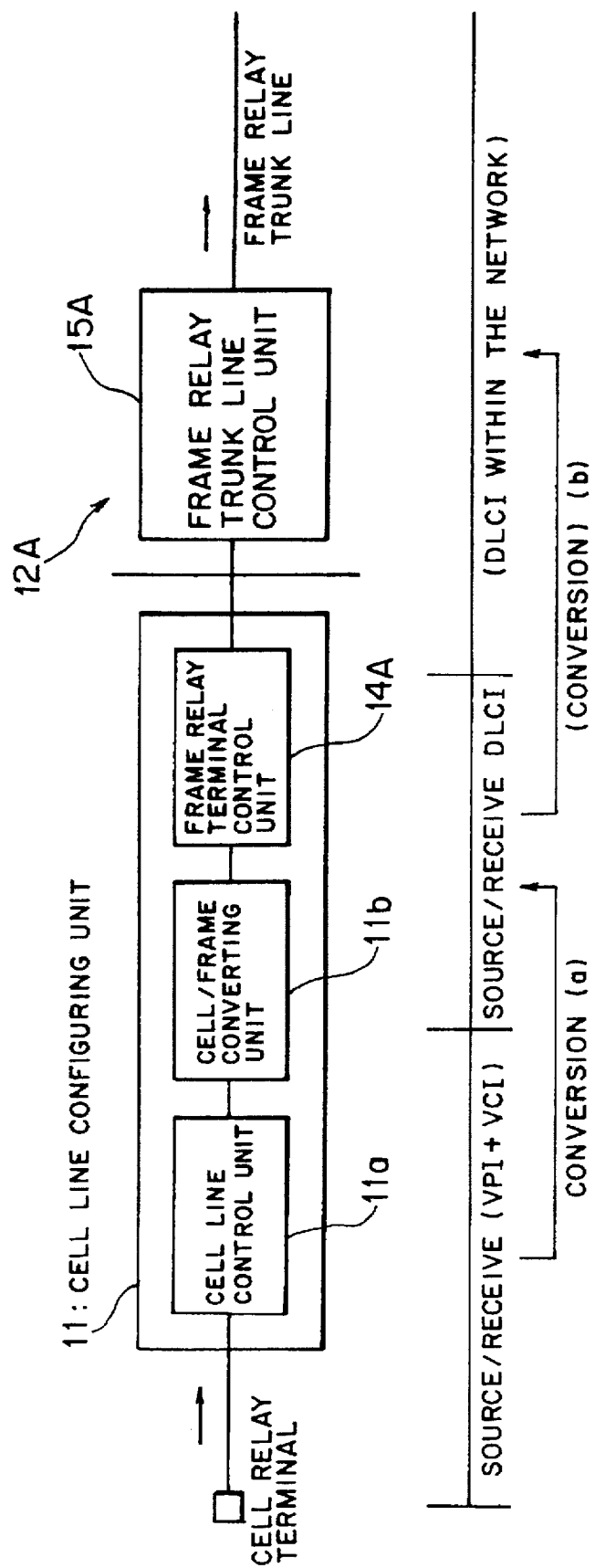
FIGS. 18 through 20 are block diagrams showing essential parts of the frame relay switch according to the embodiment of this invention.
Figure 19:
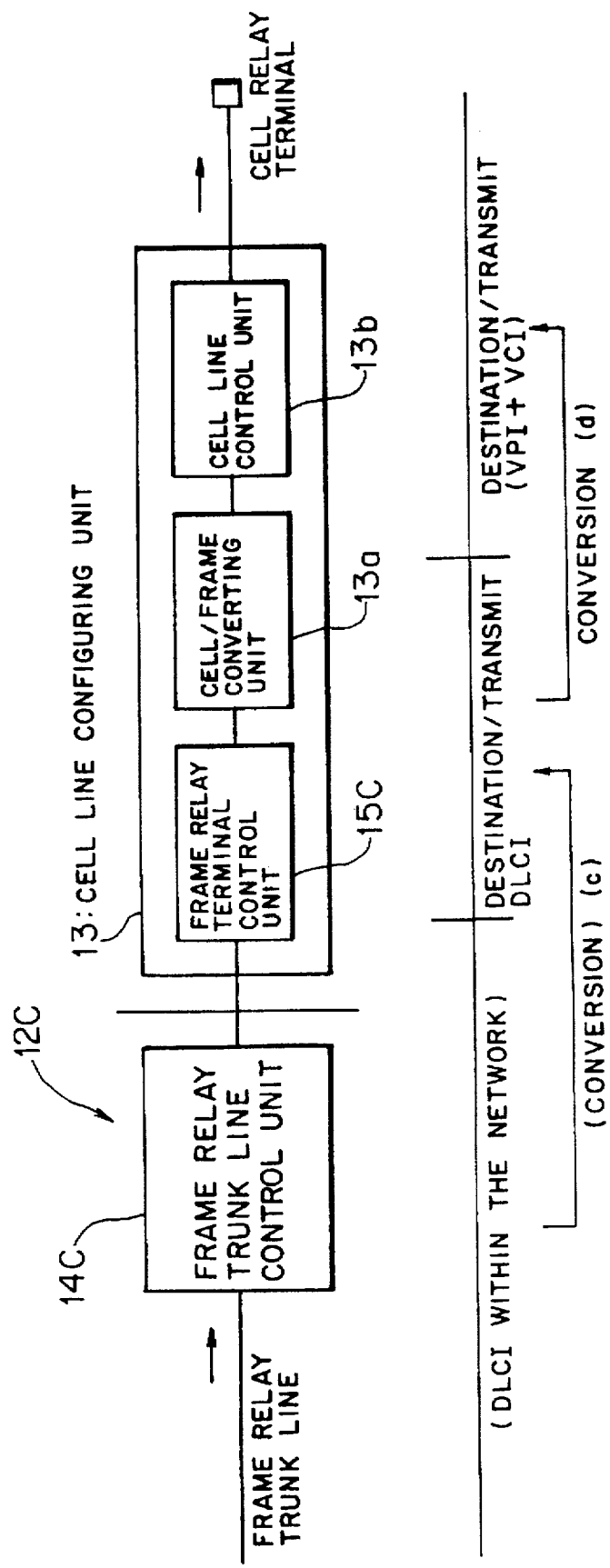

For instance, a logical channel converting process by the source side (transmitter side) node 10A in the frame relay switch shown in FIG. 7 is performed as shown in FIG. 18, while a logical channel converting process by the destination side (receiver side) node 10C is performed as shown in FIG. 19.

As shown in FIG. 18, in the source side node 10A, a logical channel number (VCI) of a received cell in the cell line control unit 11a is converted into DLCI according to a corresponding logic, a frame header portion is added to the cell data as it is, sent out to the frame relay switching unit 12A and transferred in the network [refer to (a) and (b) in FIG. 18].

In the frame data received by the destination side cell line configuring unit 13, the DLCI is converted into a logical channel number of the destination side transmit cell on the basis of a relay DLCI or source side DLCI information, as shown in FIG. 19 [refer to (c) and (d) in FIG. 19].

Accordingly, the cell line configuring unit 13 in the destination side node 10C can function as a channel number information converting means for converting channel number information of the cell data on the transmitter side into channel number information of the cell data on the receiver side.

(i) Description of a First Mode of a Converting Table for the Logical Channel

Figure 20:
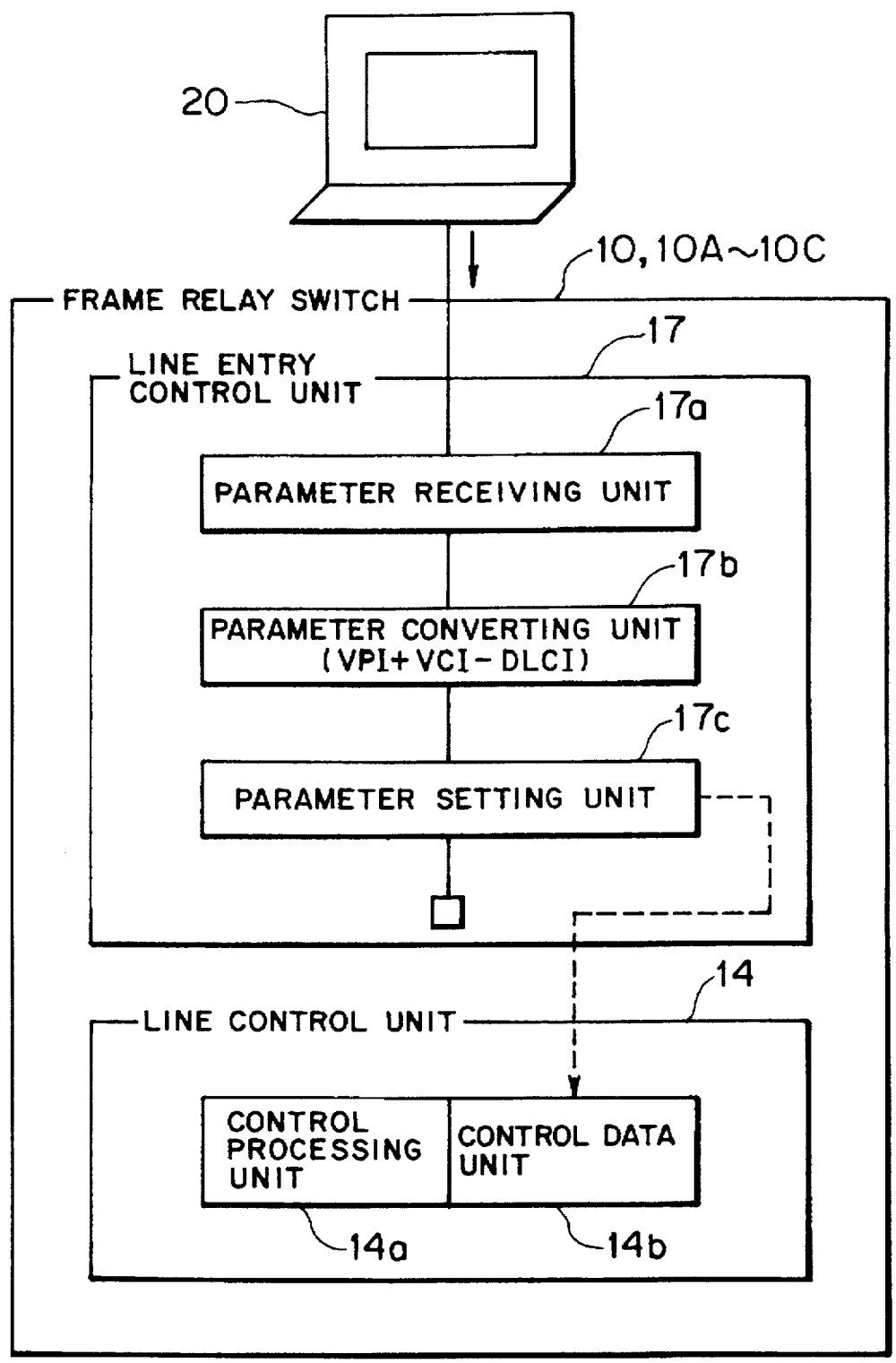
Figure 21:
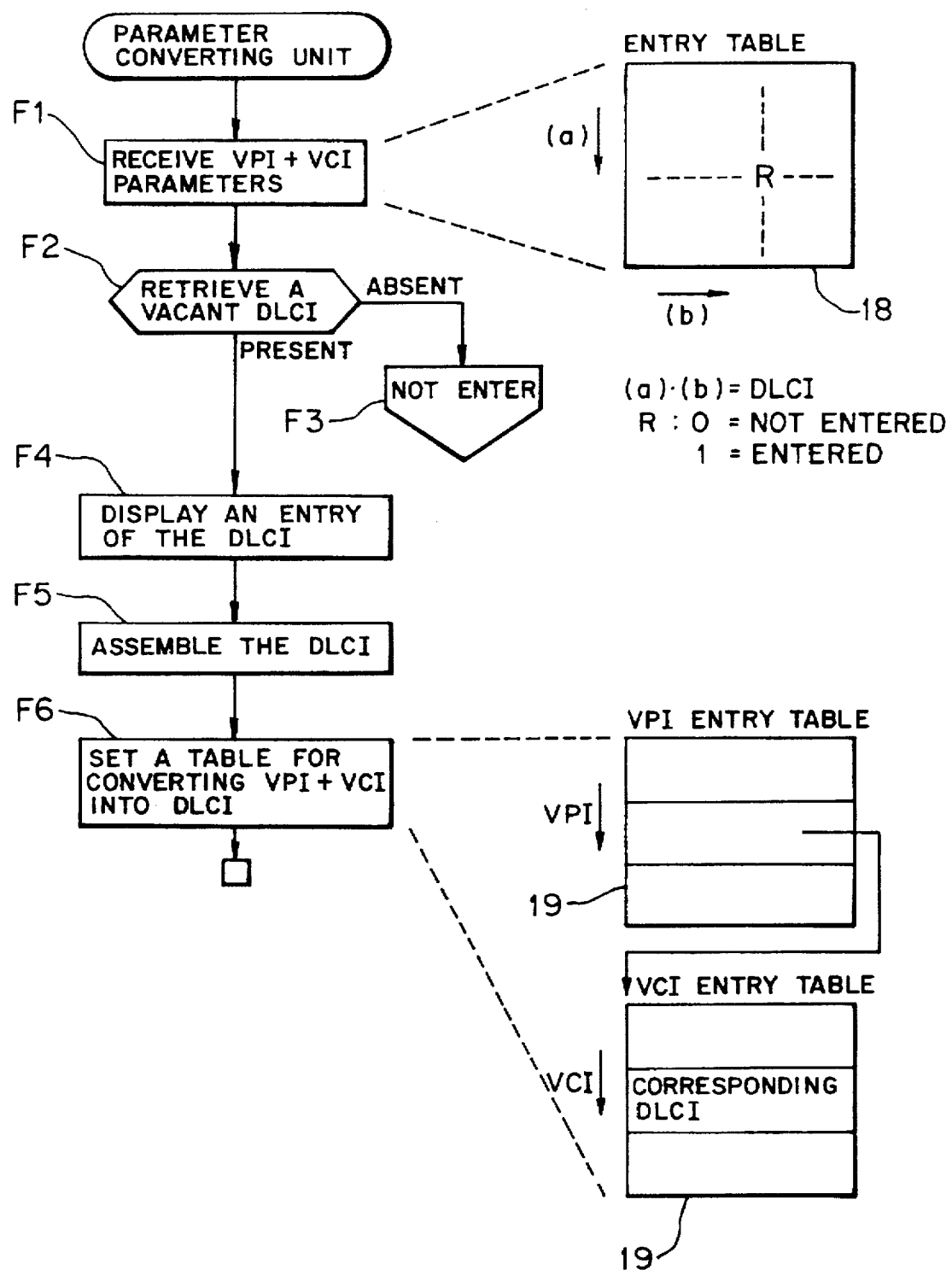
FIG. 21 is a flowchart for illustrating an operation of the embodiment of this invention.

The corresponding logic between the VCI and DLCI used in the logical channel converting process in the node 10A in the above (h), or the corresponding logic between the DLCI and VCI used in the logical channel converting process in the node 10C are formed as shown in FIGS. 20 and 21 when the cell interface terminal 20 is entered in the frame relay switch.

When the cell interface terminal 20 is entered in the frame relay switch, the VCI is automatically assigned to a vacant DLCI in the parameter converting unit 17b of the line entry control unit 17 by inputting types of a transmitting terminal and a receiving terminal, a line number and a used logical channel number (VPI, VCI) from the cell interface terminal 20 so as to be set from the parameter setting unit 17c in the control data unit 14b.

More specifically, the parameter converting unit 17b has an entry table 18 in which, when the parameter converting unit 17b receives transmit VPI and VCI, a corresponding DLCI is entered in a predetermined position (R), and an entry table 19 for converting the receive VPI and VCI into a corresponding DLCI, thereby implementing a logical channel conversion in the transmitter side node 10A and a logical channel conversion in the receiver side node 10C.

The logical channel conversion process in the node 10A or the node 10c by the parameter converting unit 17b with the above structure will be next described with reference to FIG. 21.

If the receive VPI, VCI and transmit VPI and VCI are thrown in from the cell interface terminal 20, the frame relay switch receives them (Step F1), and retrieves a vacant DLCI on the basis of data entered in the entry table 18 (Step F2).

If there is no vacant DLCI in the entry table 18 (an Absent route at Step F2), "not entered" is displayed on the cell interface terminal 20 (Step F3). If there is a vacant DLCI (a Present route at Step F2), the DLCI is entered by setting "1" in a position of the vacant DLCI, and "entered" is displayed on the cell interface terminal 20 (Steps F4 and F5).

On the basis of the transmit VPI and VCI thrown in from the cell interface terminal 20, the corresponding DLCI is entered in the entry table 19 (Step F6).

Whereby, it is possible to automatically perform the channel converting process between the cell data and the frame data.

(j) Description of a Second Mode of Converting the Logical Channel

Figure 22:
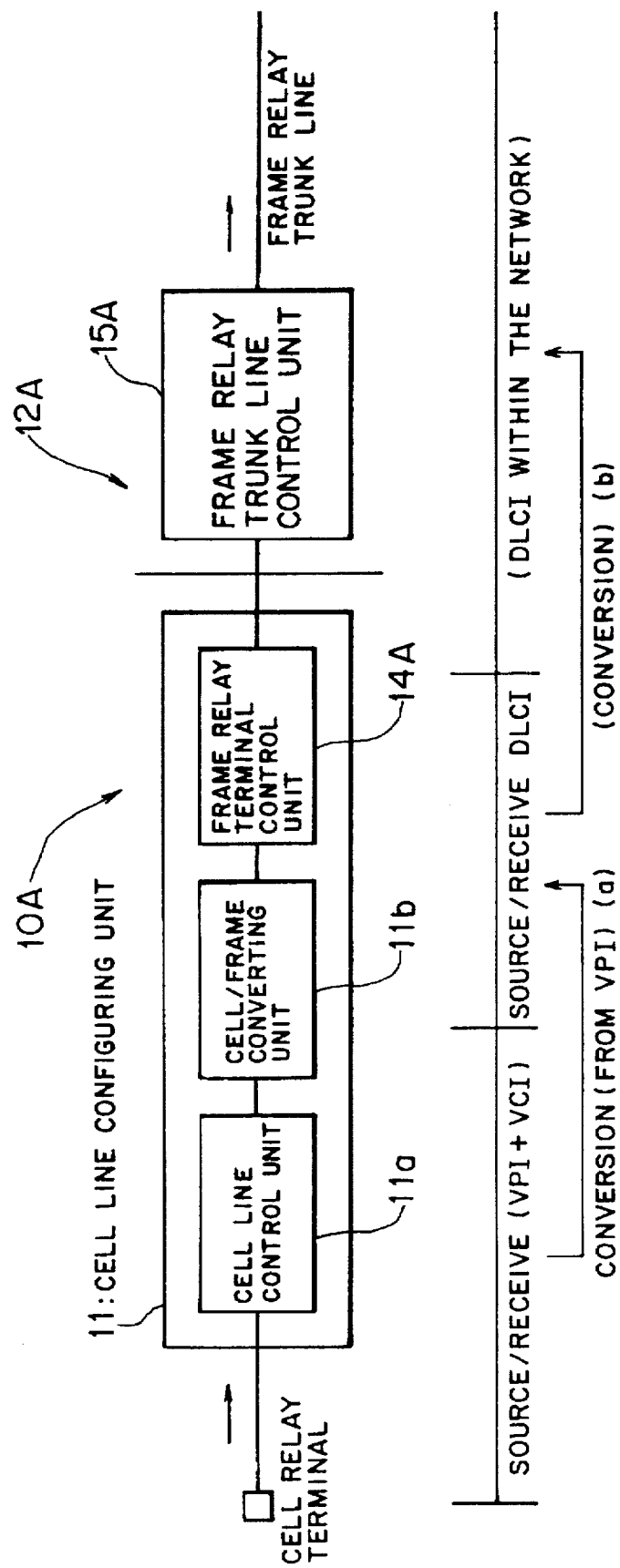
FIGS. 22 through 24 are block diagrams showing essential parts of the frame relay switch according to the embodiment of this invention.
Figure 23:
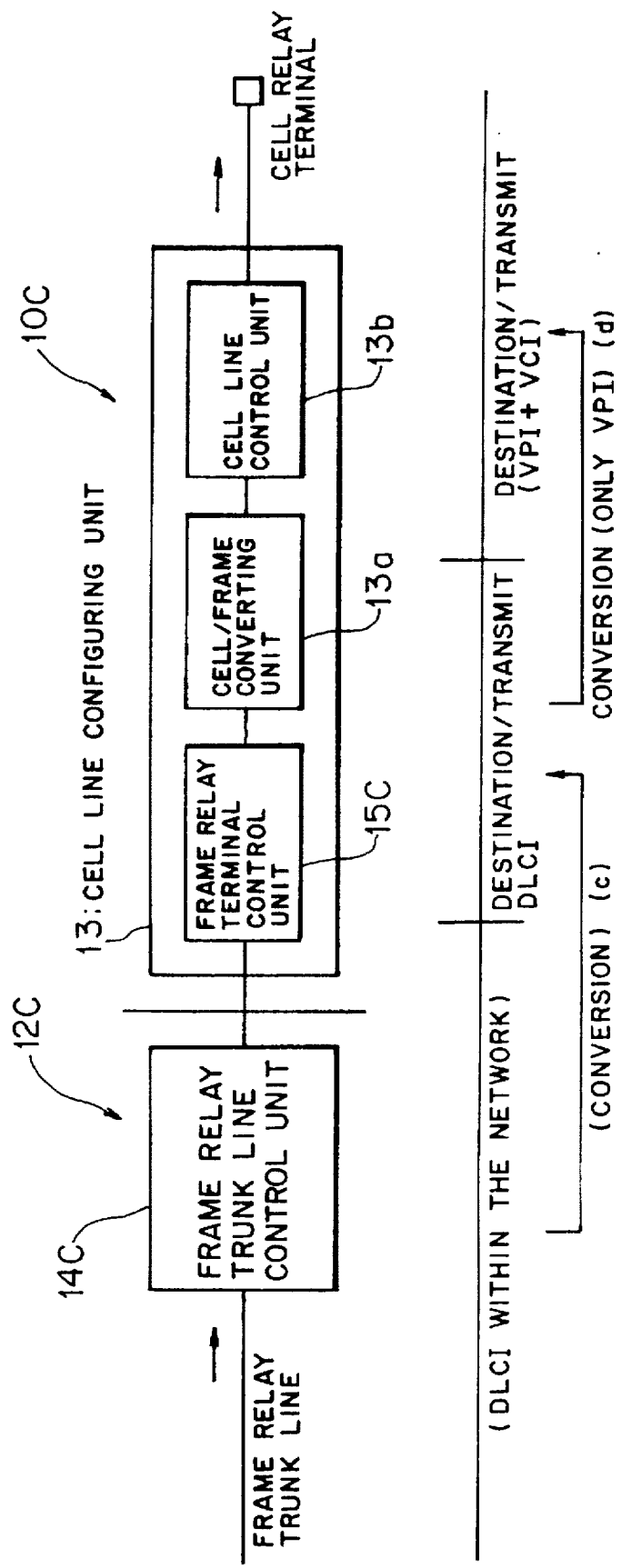

The logical channel converting process in the frame relay switch according to this embodiment may be performed as shown in FIGS. 22 and 23, as well as shown in FIGS. 18 and 19.

For instance, the logical channel converting process in the originator side (transmitter side) node 10A in the frame relay switch shown in FIG. 7 can be performed as shown in FIG. 22, while the logical channel converting process in the destination side (receiver side) node 10C can be performed as shown in FIG. 23.

As shown in FIG. 22, in the source side node 10A, a logical channel number (VPI) of a receive cell in the cell line control unit 11a is converted into a DLCI according to a corresponding logic, a frame header portion is added to the cell data as it is, and the cell data is sent out to the frame relay converting unit 12A, and transferred in the network [refer to (a) and (b) in FIG. 22]. A VCI inputted from the cell interface terminal 20 is used throughout in the network.

The frame data received by the cell line control unit 13 on the destination side is converted into a VPI of the transmit cell on the destination side on the basis of a relay DLCI or source side DLCI information as shown in FIG. 23 [refer to (c) and (d) in FIG. 23].

Accordingly, the cell line configuring unit 11 on the transmitter side functions as a data ling connection identification information setting means for setting a DLCI (data link connection identification information) of frame data corresponding to a VPI (virtual path identification information) in the transmit cell data, while the cell line configuring unit 13 functions as a virtual path identification information setting means for setting a VPI in the cell data corresponding to a DLCI in the received frame data.

Figure 24:
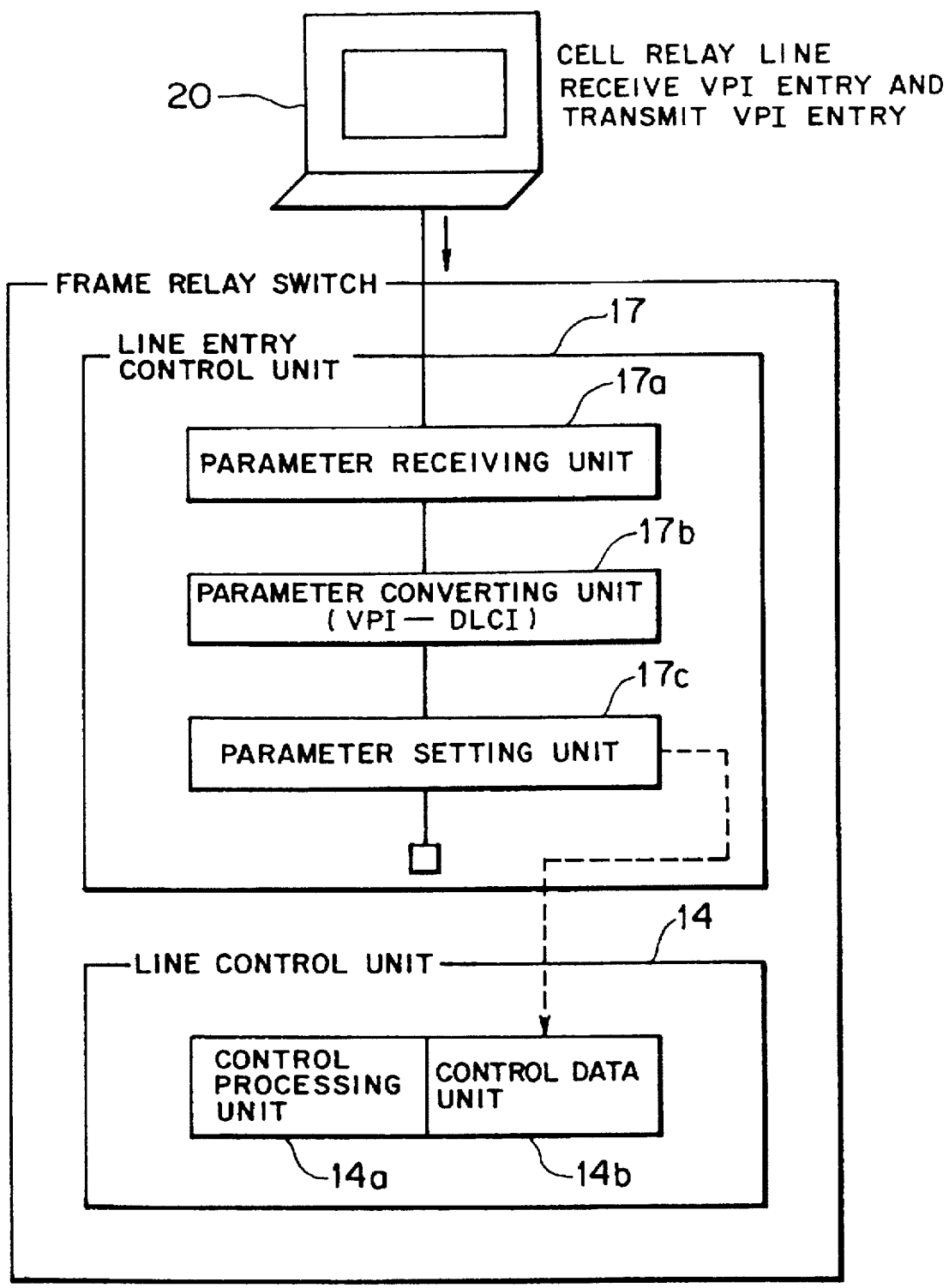
Figure 25:
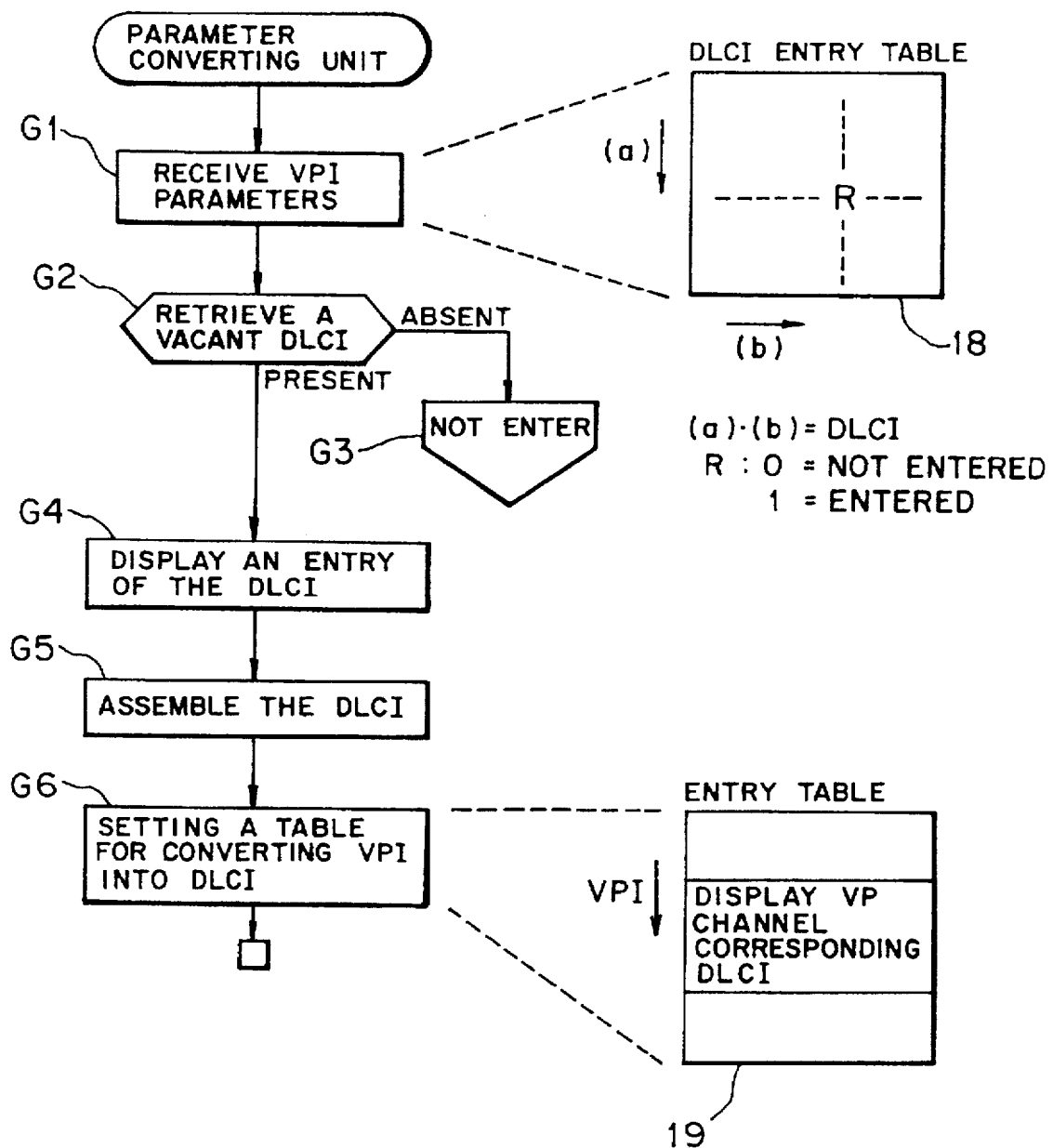
FIG. 25 is a flowchart for illustrating an operation of the embodiment of this invention.

(k) Description of a Second Mode of Making a Conversion Table in the Logical Channel As having been described the logical channel converting process in the node 10A in the above (h), the table used to correspond the VPI with the DLCI used in the logical channel converting process or the table used to correspond the DLCI with the VCI used in the logical channel converting process in the node 10C are formed as shown in FIGS. 24 and 25 when the cell interface terminal 20 is entered in the frame relay switch.

Reference numeral 17 denotes a line entry control unit. If VCI input information is omitted when the cell interface terminal 20 is entered in the frame relay switch, the line entry control unit 17 judges that it is a path entry for only VPI, and so enters the VPI and a vacant DLCI that they correspond 1:1. The line entry control unit 17 has a parameter receiving unit 17a, a parameter converting unit 17b and a parameter setting unit 17c each of which is similar to that shown in FIG. 20.

The parameter converting unit 17b has an entry table 18 in which, when a transmit VPI is inputted to the parameter converting unit 17b, a corresponding DLCI is entered in a predetermined position (R) so as to be able to retrieve a vacant DLCI.

The parameter converting unit 17b also has an entry table 19 for converting an inputted transmit VPI and an inputted receive VPI into a corresponding DLCI so as to implement a logical channel conversion in the transmitter side node 10A and a logical channel conversion in the receiver side node 10C.

The logical channel conversion process in the node 10A or the node 10C by the parameter converting unit 17b with the above structure will be next described with reference to FIG. 25.

When a receive VPI and a transmit VPI is thrown in from the cell interface terminal 20, the frame relay switch receiving these VPIs (Step G1) retrieves a vacant DLCI on the basis of data entered in the entry table 18 (Step G2).

If there is no vacant DLCI in the entry table 18 (an Absent route at Step G2), "not entered" is displayed on the cell interface terminal 20 (Step G3). If there is a vacant DLCI (a Present route at Step G2), "1" is set in a position of the vacant DLCI so as to enter the DLCI, and "entered" is displayed on the cell interface terminal 20 (Steps G4 and G5).

A corresponding DLCI is entered in the entry table 19 on the basis the transmit VPI and VCI thrown in from the cell interface terminal 20 (Step G6).

Whereby, it is possible to automatically perform a channel converting process between the cell data and the frame data.

Figure 26:
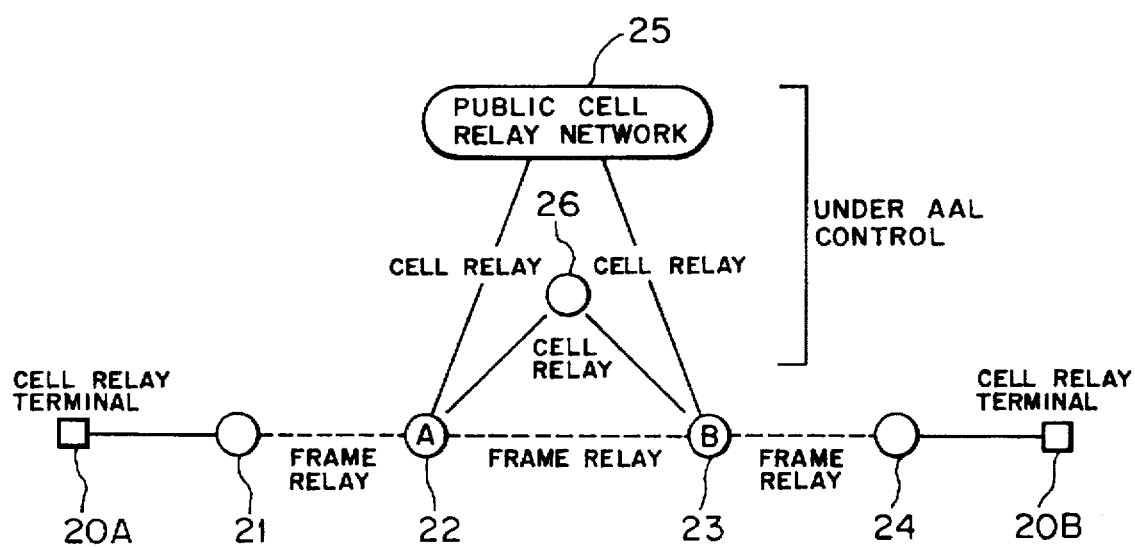
FIG. 26 shows a first mode employing a relay by a cell relay as a relay in a frame relay network according to the embodiment of this invention.

(1) Description of a First Mode Using a Relay by a Cell Relay in a Relay in a Frame Relay Network If using a frame relay network in a relay system in a communication system accommodating the above cell interface terminal, a relay by a cell relay in the frame relay is possible as shown in FIG. 26.

If cell interface terminals 20A and 20B communicate with each other in a communicating system shown in FIG. 26 by relaying nodes 21 through 24, a frame relay is implemented between the node 21 and node 22, and the node 23 and the node 24. Between the node 23 and the node 24, a cell relay is feasible by using a public cell relay network 25 or a cell relay node 26.

Here, the node 21 converts cell data into frame data and sends it out to the frame interface line as well as the above-mentioned node 10A (refer to FIG. 7). The node 24 converts frame data into cell data and sends it out to the cell interface line, as well as the above-mentioned node 10C.

The node 22 is provided with a control circuit that should perform an adaptation control. If the node 22 functions as an interface for relaying cells, the node 22 converts a frame into a cell by conducting the adaptation control. The detailed structure of the node 22 is as shown in FIG. 27.

Figure 27:
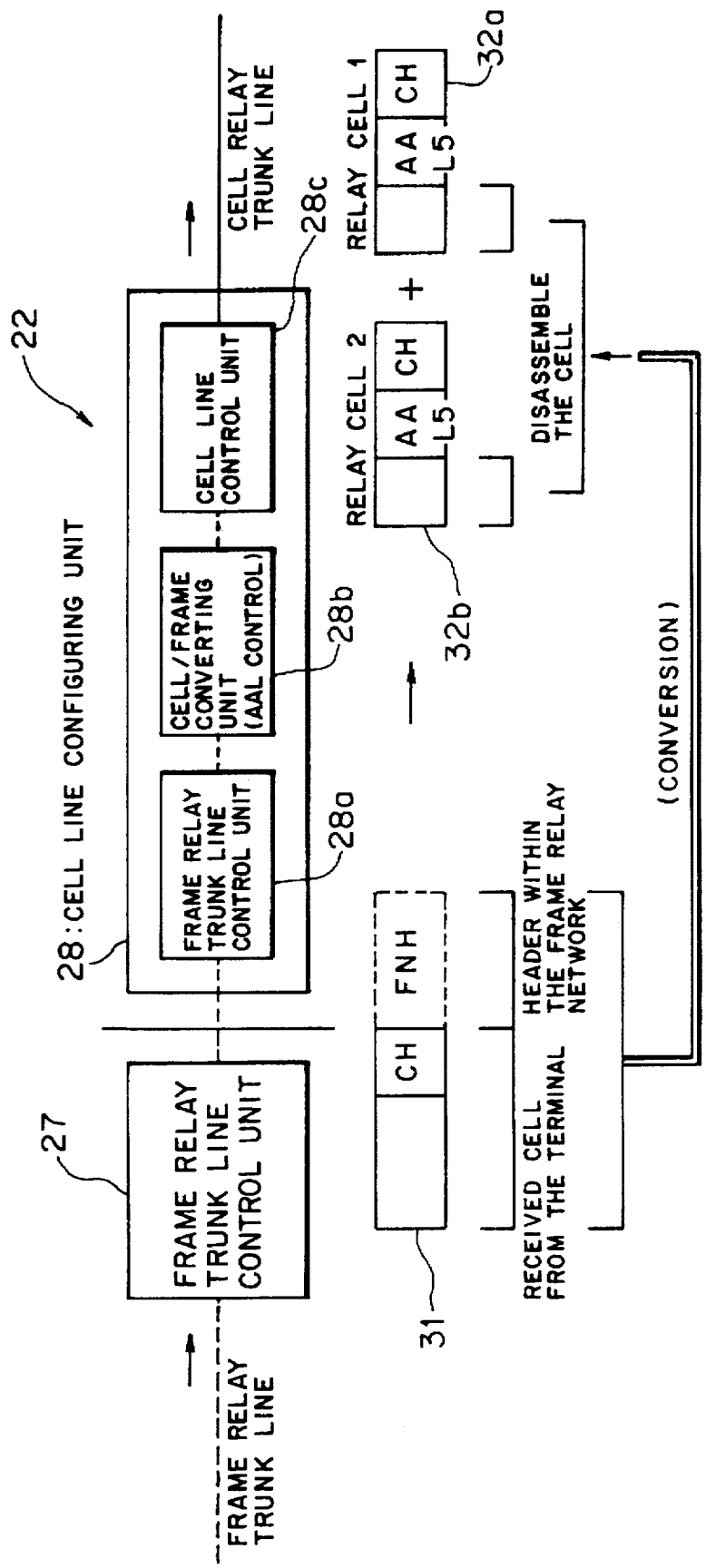
FIGS. 27 and 28 are block diagrams showing essential parts of the frame relay switch according to the embodiment of this invention.

In FIG. 27, the node 22 has a frame relay trunk line control unit 27 and a cell line configuring unit 28 having functions which are basically the same as those in the above-mentioned node 10C, respectively (refer to reference numeral 14C).

The cell line configuring unit 28 has a frame relay trunk line control unit 28a and a cell line control unit 28c whose functions are basically the same as those of the cell line configuring unit 13, respectively, (refer to reference numerals 15c and 13b).

Reference numeral 28b denotes a cell/frame converting unit. The cell/frame converting unit 28b is configured with a control circuit that should perform an adaptation control. The cell/frame converting unit 28b converts frame data into cell data by conducting an AAL control (ATM Adaptation Layer, Adaptation Control) based on a protocol of an upper layer of the ATM layer.

The node 23 is provided with a control circuit that should perform an adaptation control. The node 23 converts cell data into frame data by conducting the adaptation control. The detailed structure of the node 23 is as shown in FIG. 28.

Figure 28:
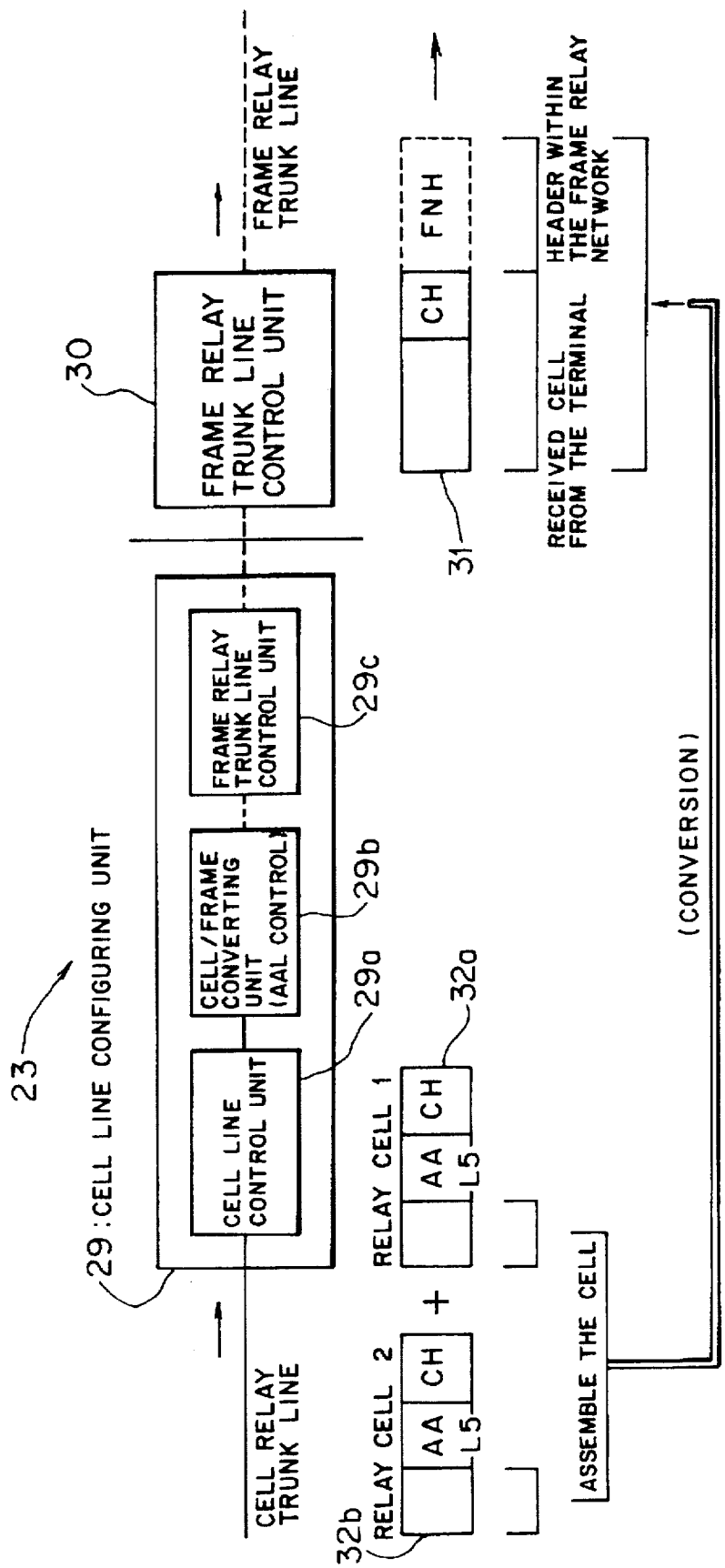

In FIG. 28, the node 23 has a cell line configuring unit 29 and a frame relay trunk line control unit 30 whose function is basically the same as that in the above-mentioned node 10A (refer to reference numeral 15A).

The cell line configuring unit 29 has a cell line control unit 29a and a frame relay trunk line control unit 29c whose functions are basically the same as those in the cell line configuring unit 11, respectively (refer to reference numerals 11a ad 14A).

Reference numeral 29b denotes a cell/frame converting unit. The cell/frame converting unit 29b converts cell data into frame data by conducting the AAL control (ATM Adaptation Layer, Adaptation control) defined by a protocol of the upper layer of the ATM layer.

An operation in the case where a relay by a cell relay is used in a relay in a frame relay network with the above structure will be next described.

When the frame relay trunk line control units 27 and 28a receive frame data 31 from a cell interface terminal 20A, for example, the cell/frame converting unit 28b disassembles the frame data 31 into, for example, two relay data cells 32a and 32b in the AAL control to implement a cell relay.

When the above data cells 32a and 32b are relayed in the cell relay, it is possible to select a path via either the public cell relay network 25 or the cell relay node 28 depending on these data cells 32a and 32b.

When the node 23 receives the relay data cells 32a and 32b via either the public cell relay network 25 or the relay node 26, the cell/frame converting unit 29b converts the relay data cells 32a and 32b into original frame data 31 by implementing the AAL control, and sends it out to the frame relay trunk line via the frame relay trunk line control unit 30.

If the cell relay is implemented in a part of the relay line in the frame relay, it is possible to implement the cell relay without damaging information (a header in the network) of the relay frame, and increase a freedom in design of the relay system in the communication system, as well.

Incidentally, the frame data is converted into cell data to implement the cell relay between the above node 22 and the node 23 in the above example. However, this invention is not limited to the above example, but it is possible to select a path by the frame relay without a conversion of the data to communicate.

Figure 29:
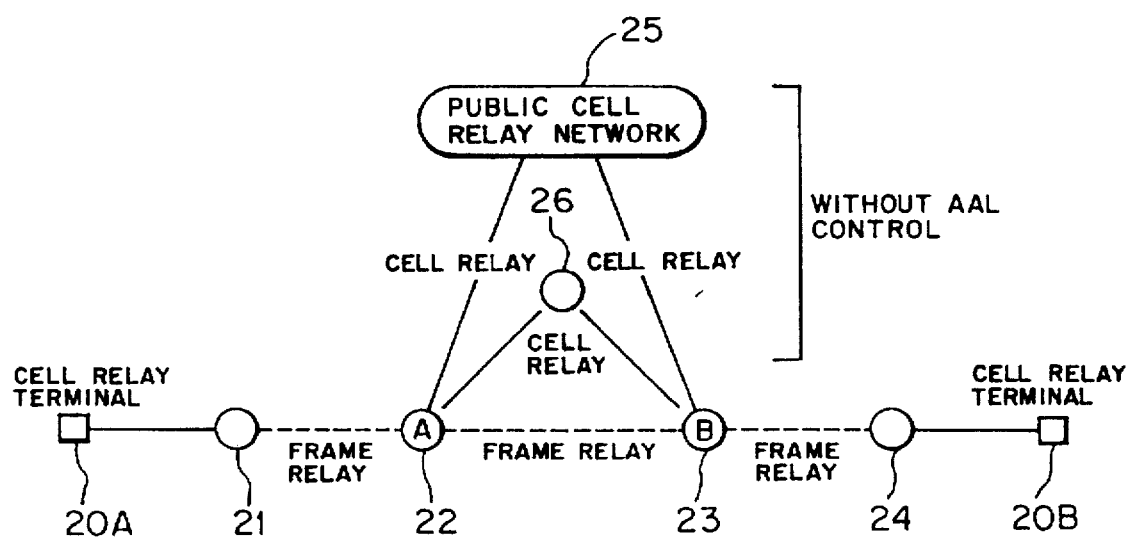
FIG. 29 shows a second mode employing a relay by a cell relay as a relay in the frame relay network according to the embodiment of this invention.

(12) Description of a Second Mode Using a Relay by Cell Relay in a Relay in the Frame Relay Network If a cell relay is conducted in a part of a relay line in the above frame relay as shown in FIG. 29, the cell relay is feasible without the ALL control.

Figure 30:
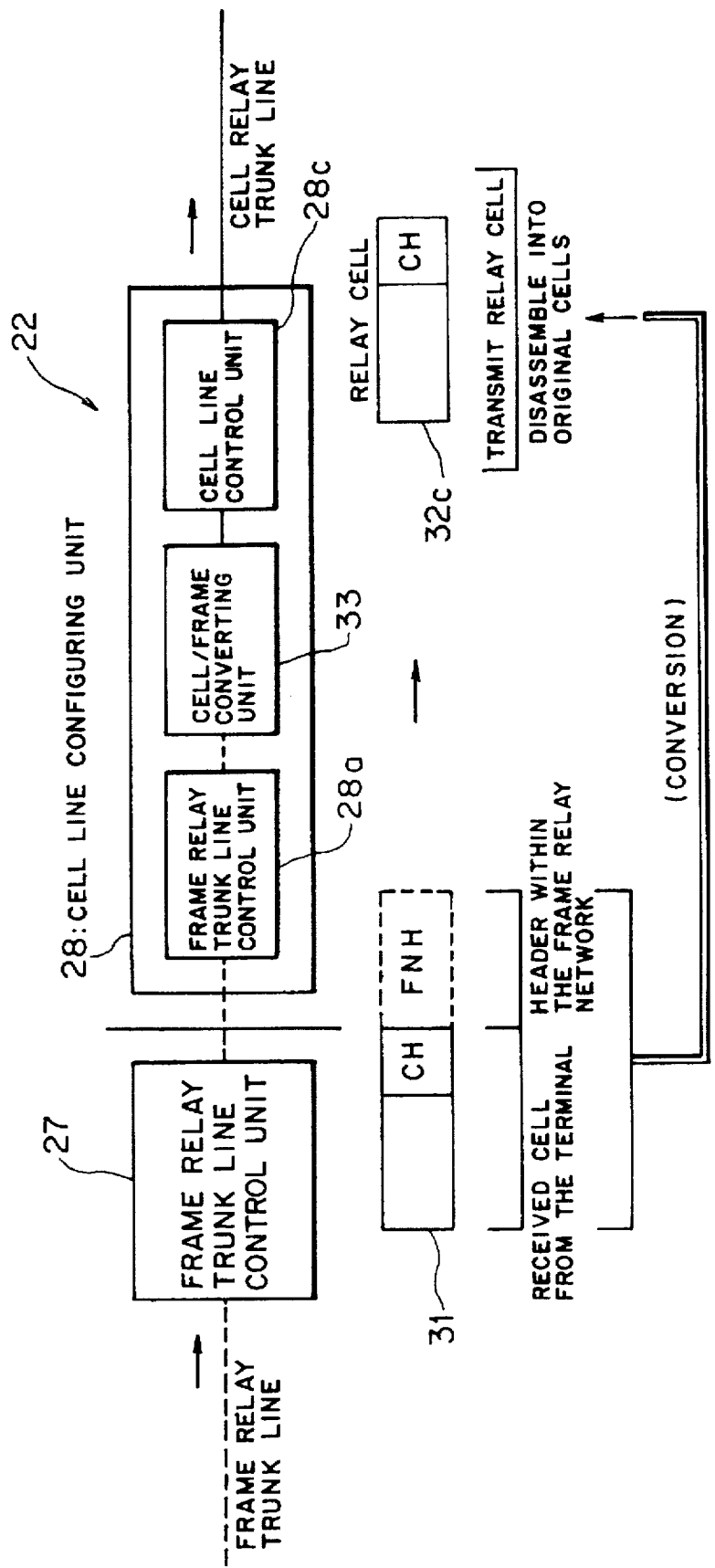
FIGS. 30 and 31 are block diagrams showing essential parts of the frame relay switch according to the embodiment of this invention.
Figure 31:
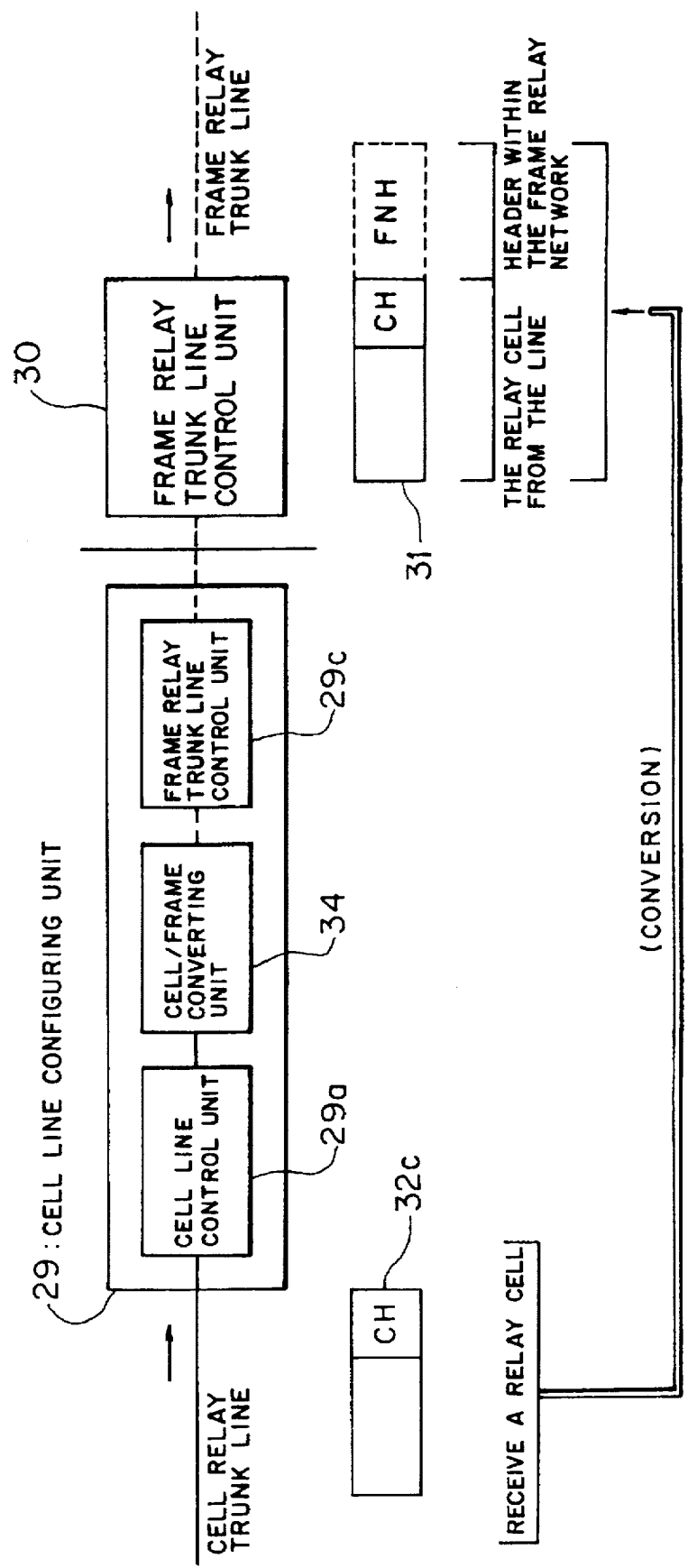

In this case, the above node 22 has a structure shown in FIG. 30, while the node 23 has a structure shown in FIG. 31.

As shown in FIGS. 30 and 31, the node 22 has a frame relay trunk line control unit 27 and a cell line configuring unit 28 whose functions are basically the same as those of the above-mentioned node 10C shown in FIG. 7, respectively (refer to reference numerals 14C and 13). The node 23 has a cell line configuring unit 29 and a frame relay trunk line Control unit 30 whose functions are basically the same as those of the node 10A, respectively (refer to reference numerals 11 and 15A).

Accordingly, a cell line configuring unit 28 shown in FIG. 30 has a frame relay trunk line control unit 28a, a cell/frame converting unit 33 and a cell line control unit 28c whose functions are basically the same as those of the cell line configuring unit 13, respectively (refer to reference numerals 15C, 13a and 13b).

Similarly, a cell line configuring unit 29 shown in FIG. 31 has a cell line control unit 29a, a cell/frame converting unit 34 and a frame relay trunk line control unit 29c whose functions are basically the same as those of the cell line configuring unit 11, respectively (refer to reference numerals 11a, 11b and 14A).

When the node 22 receives frame data 31, the cell/frame converting unit 33 deletes a header within the frame relay network, and so converts (encapsulates) it into a relay cell 32c as it is that they correspond 1:1.

The node 23 receives the relay cell 32c from the node 22 via a public cell relay network 25 or a cell relay node 26. The relay cell 32c is converted into original frame data 31 by the cell/frame converting unit 34, and sent out to the frame relay trunk line via the frame relay trunk line control unit 30.

Whereby, it is possible that a cell relay is conducted in a part of the relay line without the adaptation control so as to increase a freedom in design of the relay system in the communication system.

It is a matter of course that it is possible that the frame data is not converted into the cell data between the node 22 and the node 23 but a path by the frame relay is selected between the node 22 and the node 23 to communicate, similarly to the relay mode in the above (11).

(m) Description of a Common Control Circuit

Figure 32:
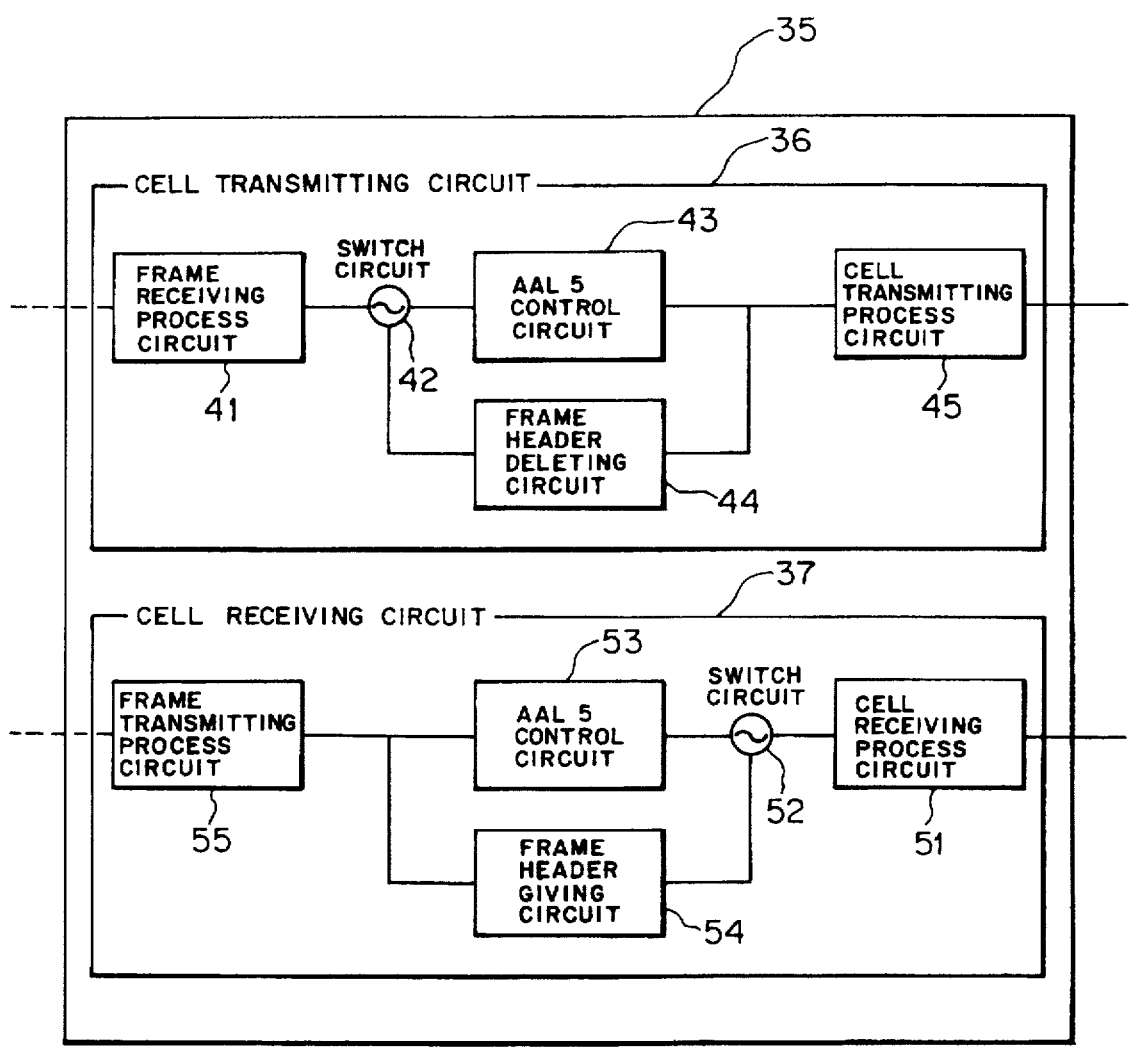
FIG. 32 is a block diagram showing a control circuit used in common according to the embodiment of this invention.

The cell/frame conversion by the cell line configuring units 28 and 29 as described in the above (11) and (12) may be conducted by one control circuit 35 as shown in FIG. 32.

The control circuit 35 has a cell transmitting circuit 38 functioning as a cell/frame converting unit 28b and a cell/frame converting unit 33 and a cell receiving circuit 37 functioning as a cell/frame converting unit 29b or a cell/frame converting unit 34.

The cell transmitting circuit 38 has a frame receiving process unit 41, a switch circuit 42, an AAL 5 control circuit 54, a frame header deleting circuit 44 and a cell transmitting process circuit 45. The cell receiving circuit 37 has a cell receiving process circuit 51, a switch circuit 52, an AAL 5 control circuit 53, a frame header giving circuit 54 and a frame transmitting process circuit 55.

When frame data from the the frame receiving process circuit 41 is inputted to the AAL 5 control circuit 43 by a switching by the switch circuit 42, the cell transmitting circuit 36 functions as the cell/frame converting unit 28b. On the other hand, when the frame data is inputted to the frame header deleting circuit 44 by a switching by the switch circuit 42, the cell transmitting circuit 36 functions as the cell/frame converting unit 33 (refer to FIGS. 27 and 30).

Similarly, when cell data from the cell receiving process circuit 51 is inputted to the AAL 5 control circuit 53 by a switching by the switch circuit 52, the cell receiving circuit 37 functions as the cell/frame converting unit 29b. On the other hand, when the cell data is inputted to the frame header giving circuit 54 by a switching by the switch circuit 52, the cell receiving circuit 38 functions as the cell/frame converting unit (refer to FIGS. 28 and 31).

As above, it is possible to selectively implement a cell/frame conversion with the AAL control and a cell frame conversion without the AAL control, and permit a conversion from frame data to cell data and a conversion from cell data to frame data in the common control circuit 35, whereby a design of the system may be simplified.

(n) Others

The above embodiment has been described by way of an example where this invention is applied to a frame relay switch. However, this invention is not limited to this example, but applicable to a router or a B-TA (Broadband Terminal Adapter) having the similar function as the above frame relay switch.

What is claimed is:

1. A variable length data switch comprising:
   a receiver side cell line configuring unit having a fixed length data receiving means for receiving fixed length data from a fixed length data line and a receiver side data conversing means for converting the fixed length data received by said fixed length data receiving means into variable length data;
   a variable length data switching unit for switching the variable length data from said receiver side cell line configuring unit; and
   a transmitter side cell line configuring unit having a transmitter side data converting means for converting the variable length data from said variable length data switching unit into fixed length data and a fixed length data transmitting means for transmitting the converted fixed length data to a second fixed length data line.

2. The variable length data switch according to claim 1, wherein said receiver side data converting means has a means for converting fixed length data inputted for each predetermined time determined depending on said fixed length data line as one group of variable length data.

3. The variable length data switch according to claim 1 further comprising a mode switching converting means for switching a converting process by said receiver side data converting means between a mode of converting fixed length data inputted for each predetermined time into one group of variable length data and a mode of converting one group of fixed length data into one group of variable length data for each communication channel in said fixed length data line to perform the converting process.

4. The variable length data switch according to claim 1, wherein said transmitter side cell line configuring unit has a channel number information converting means for converting channel number information of the fixed length data on a transmitter side into channel number information on the fixed length data on a receiver side.

5. The variable length data switch according to claim 4, wherein said channel number information converting means is a table having channel number information of the fixed length data on the receiver side corresponding to channel number information of the fixed length data on the transmitter side.

6. The variable length data switch according to claim 1, wherein said receiver side cell line configuring unit has a data link connection identification information setting unit for setting data link connection identification information of variable length data corresponding to virtual path identification information in transmit fixed length data, and said transmitter side cell line configuring unit has a virtual path identification information setting means for setting virtual path identification information in fixed data corresponding to data link connection identification information in receive variable length data.

7. The variable length data switch according to claim 1, wherein said variable length data switching unit has a flow control means for performing a flow control in said second fixed length data line and performing a flow control on the fixed length data from said fixed length data line.

8. The variable length data switch according to claim 7 further comprising a parameter converting means for converting parameters for the flow control on said fixed length data into parameters for the flow control on variable length data when said flow control means performs the flow control on said fixed length data.

9. A variable length data switch comprising:
a receiver side cell line configuring unit having a fixed length data receiving means for receiving fixed length data from a fixed length data line and a receiver side data converting means for converting said received fixed length data into variable length data;
a variable length data switching unit for switching the variable length data from said receiver side cell line configuring unit; and
a variable length data transmitting unit for transmitting the variable length data from said variable length data switching unit to a variable length data line.

10. The variable length data switch according to claim 9, wherein said receiver side data converting means has a means for converting fixed length data inputted for each predetermined time determined depending on said fixed length data line as one group of variable length data.

11. The variable length data switch according to claim 9 further comprising a mode switching converting means for switching a converting process by said receiver side data converting means between a mode of converting fixed length data inputted for each predetermined time into one group of variable length data and a mode of converting one group of fixed length data into one group of variable length data for each communication channel in said fixed length data line to perform the converting process.

12. The variable length data switch according to claim 9, wherein said variable length data switching unit has a flow control means for performing a flow control in said variable length data line and performing a flow control on the fixed length data from said fixed length data line.

13. The variable length data switch according to claim 12 further comprising a parameter converting means for converting parameters for the flow control on said fixed length data into parameters for the flow control on variable length data when said flow control means performs the flow control on said fixed length data.

14. A variable length data switch comprising:
a variable length data receiving means for receiving variable length data from a variable length data line;
a variable length data switching unit for switching the variable length data from said variable length data receiving means; and
a transmitter side cell line configuring unit having a transmitter side data converting means for converting the variable length data from said variable length data switching unit into fixed length data and a fixed length data transmitting means for transmitting the fixed length data converted by said transmitter side data converting means to a fixed length data line.

15. The variable length data switch according to claim 14, wherein said transmitter side cell line configuring unit has a channel number information converting means for converting channel number information of the fixed length data on a transmitter side into channel number information on the fixed length data on a receiver side.

16. The variable length data switch according to claim 15, wherein said channel number information converting means is a table having channel number information of the fixed length data on the receiver side corresponding to channel number information of the fixed length data on the transmitter side.

17. A variable length data switch comprising:
a variable length data switching unit for switching variable length data;
a receiver side cell line configuring unit connected to said variable length data switching unit, and having a fixed length data receiving means for receiving fixed length data from a fixed length data line and a receiver side data converting means for converting the fixed length data received by said fixed length data receiving means into variable length data and outputting it to said variable length data switching unit;
a transmitter side cell line configuring unit connected to said Variable length data switching unit, and having a transmitter side data converting means for converting the variable length data from said variable length data switching unit into fixed length data and a fixed length data transmitting means for transmitting the fixed length data converted by said transmitter side data converting means to a fixed length data line;
said variable length data switching unit having a variable length data receiving means for receiving the variable length data and a variable length data transmitting means for transmitting the variable length data switched to a variable length data line.

18. The variable length data switch according to claim 17, wherein said variable length data receiving means has a flow control means for performing a flow control in said variable length data line and performing a flow control on the fixed length data from said receiver side cell line configuring unit.

19. The variable length data switch according to claim 18 further comprising a parameter converting means for converting parameters for the flow control on said fixed length data into parameters for the flow control on variable length data when said flow control means performs the flow control on said fixed length data.

20. The variable length data switch according to claim 17, wherein said receiver side data converting means has a means for converting fixed length data inputted for each predetermined time determined depending on said fixed length data line as one group of variable length data.

21. The variable length data switch according to claim 17 further comprising a mode switching converting means for switching a converting process by said receiver side data converting means between a mode of converting fixed length data inputted for each predetermined time into one group of variable length data and a mode of converting one group of fixed length data into one group of variable length data for each communication channel in said fixed length data line to perform the converting process.

22. The variable length data switch according to claim 17, wherein said transmitter side cell line configuring unit has a channel number information converting means for converting channel number information of the fixed length data on a transmitter side into channel number information on the fixed length data on a receiver side.

23. The variable length data switch according to claim 22, wherein said channel number information converting means is a table having channel number information of the fixed length data on the receiver side corresponding to channel number information of the fixed length data on the transmitter side.

24. The variable length data switch according to claim 17, wherein said receiver side cell line configuring unit has a data link connection identification information setting unit for setting data link connection identification information of variable length data corresponding to virtual path identification information in transmit fixed length data, and said transmitter side cell line configuring unit has a virtual path identification information setting means for setting virtual path identification information in fixed data corresponding to data link correction identification information in receive variable length data.

25. The variable length data switch according to claim 17, wherein said receiver side cell line configuring unit and said transmitter side cell line configuring unit has a common control circuit for performing a cell relay on the basis of a protocol of an upper layer.

26. A variable length data relaying method using a variable length data switch comprising the steps of:

upon a relay of variable length data using said variable length data switch, receiving fixed length data from a fixed length data line, converting the received fixed length data into variable length data, switching the variable length data, then converting the variable length data into fixed length data, and switching the fixed length data in the form of variable length data using plural variable length data switches transmitting the fixed length data to a fixed length data line.

27. A variable length data relaying method using a variable length data switch comprising the steps of:

switching variable length data received from a variable length data line, converting the variable length data into fixed length data, transmitting said converted fixed length data to a fixed length data line in a first variable length data switch comprising a variable length data receiving means for receiving variable length data from the variable length data line, a variable length data switching unit for switching the variable length data from said variable length data receiving means, and a transmitter side cell line configuring unit having a transmitter side data converting means for converting the variable length data form said variable length data switching unit into fixed length data and a fixed length cell transmitting means for transmitting said fixed length data converted to said fixed length data line;

performing a cell relay of the fixed length data from said first variable data switch on the basis of a protocol of an upper layer; and converting the fixed length data relayed in the cell relay into variable length data, switching said variable length data and transmitting it to a variable length data line in a second variable length data switch comprising a receiver side cell line configuring unit having a fixed length data receiving means for receiving fixed length data from a fixed length data line and a receiver side data converting means for converting said fixed length data received into variable length data, a variable length data switching unit for switching the variable length data from said receiver side cell line configuring unit and a variable length data transmitting means for transmitting the variable length data from said variable length data switching unit to said variable length data line.

* * * * *